(12) United States Patent
Smith et al.

(10) Patent No.: US 8,553,586 B2
(45) Date of Patent: Oct. 8, 2013

(54) SYSTEMS AND METHODS FOR AUTOMATICALLY BUILDING AND REPAIRING A SPANNING TREE FLOODING BACKBONE IN LINK STATE ROUTED NETWORKS

(75) Inventors: Alexander A. Smith, Marietta, GA (US); John K. Oltman, Chamblee, GA (US)

(73) Assignee: Ciena Corporation, Hanover, MD (US)

( * ) Notice: Subject to any disclaimer, the term of this patent is extended or adjusted under 35 U.S.C. 154(b) by 278 days.

(21) Appl. No.: 13/010,935

(22) Filed: Jan. 21, 2011

(65) Prior Publication Data

US 2011/0116366 A1        May 19, 2011

Related U.S. Application Data

(63) Continuation-in-part of application No. 12/580,873, filed on Oct. 16, 2009, now Pat. No. 8,089,866.

(51) Int. Cl.
    *H04L 12/28* (2006.01)
    *H04L 12/24* (2006.01)

(52) U.S. Cl.
    USPC ............... 370/256; 370/216; 370/225

(58) Field of Classification Search
    USPC .......................... 370/217–235, 256
    See application file for complete search history.

(56) References Cited

U.S. PATENT DOCUMENTS

| | | | |
|---|---|---|---|
| 4,905,233 A * | 2/1990 | Cain et al. ............... | 370/237 |
| 5,732,072 A | 3/1998 | Thanner et al. | |
| 6,757,258 B1 | 6/2004 | Pillay-Esnault | |
| 6,820,134 B1 | 11/2004 | Zinin et al. | |
| 6,928,483 B1 | 8/2005 | Cain | |
| 7,471,647 B2 * | 12/2008 | Ge et al. ............... | 370/256 |
| 7,602,706 B1 * | 10/2009 | Gardo et al. ............... | 370/219 |
| 7,646,733 B2 * | 1/2010 | Tallet et al. ............... | 370/256 |
| 7,821,972 B1 * | 10/2010 | Finn et al. ............... | 370/256 |
| 2008/0075280 A1 * | 3/2008 | Ye et al. ............... | 380/44 |
| 2008/0259784 A1 * | 10/2008 | Allan et al. ............... | 370/216 |

OTHER PUBLICATIONS

R. Ogier; MANET Extension of OSPF Using CDS Flooding_draft-ogier-manet-ospf-extension-10.txt; Nov. 19, 2007.
R. Ogier; MANET Extension of OSPF Using CDS Flooding draft-ogier-manet-ospf-extension-03.txt; Feb. 21, 2005.
M. Chandra; Extension to OSPF to Support Mobile Ad Hoc Networking—draft-chandra-ospf-manet-ext.04; Cisco Systems; Jan. 2007.
R. Ogier; "MANET Extension of OSPF using CDS flooding"; Draft-ietf-ospf-manet-ext.05; Jan. 2009.
M. Chandra; "Extension to OSPF to Support Mobile Ad Hoc Networking"; Draft-chandra-ospf-manet-ext.04; Jan. 2007.
T. Henderson; "Evaluation of OSPF MANET Extensions"; Boeing Technical Report; D950-10897-1, Jul. 2005.
Ogier and Spagnolo; MANET Extension of OSPF, draft-ogier-manet-ospf-extension-10.txt; Nov. 2007.

* cited by examiner

*Primary Examiner* — Hassan Kizou
*Assistant Examiner* — Emmanuel Maglo
(74) *Attorney, Agent, or Firm* — Clements Bernard PLLC; Christopher L. Bernard; Lawrence A. Baratta, Jr.

(57) ABSTRACT

The present disclosure provides systems and methods for a spanning tree topology used as a spanning tree flooding topology for messages on a link state routed network. Specifically, messages are only broadcast on the links in the spanning tree flooding topology thereby significantly reducing message flooding. The present disclosure also provides systems and methods for automatically, correctly, and efficiently creating, reconfiguring, and fixing the spanning tree topology in the event of any spanning tree link failures.

16 Claims, 26 Drawing Sheets

| Link Weight | ST-Bit F / NF | Neighbor Node Status (3-bits) | Hops to closest Stub node (Integer) | Is Node Responsible to fix failure on link? Y/N | Dead-End Path? Y/N |
|---|---|---|---|---|---|
| 26 | F | MLFN | 2 | N | N |
| 100 | NF | MLFN | - | - | - |
| 65 | F | STN | 2 | N | N |
| 67 | F | STN | 2 | N | N |
| 12 | F | STN | 3 | N | N |

*FIG. 15*

SYSTEMS AND METHODS FOR AUTOMATICALLY BUILDING AND REPAIRING A SPANNING TREE FLOODING BACKBONE IN LINK STATE ROUTED NETWORKS

CROSS-REFERENCE TO RELATED APPLICATION(S)

This application is a continuation-in-part of U.S. patent application Ser. No. 12/580,873 filed Oct. 16, 2009 now U.S. Pat. No. 8,089,866, and entitled "SPANNING TREE FLOODING BACKBONE SYSTEMS AND METHODS FOR LINK STATE ROUTED NETWORKS," the contents of which are incorporated in full by reference herein.

FIELD OF THE INVENTION

The present invention relates generally to networking systems and methods, and more particularly, to systems and methods for building and repairing a spanning tree flooding backbone that is used to efficiently transmit messages in link state routed networks.

BACKGROUND OF THE INVENTION

Link state (LS) routing protocols such as Open Shortest Path First (OSPF), Intermediate system to intermediate system (IS-IS), and Private Network-to-Network Interface (PNNI) (upon which Optical Signaling and Routing Protocol (OSRP) from Ciena Corporation is based) require an accurate view of the network topology (this includes knowledge regarding the presence of nodes and links, their network address, and their state (up/down) as well as the value of all link metrics (e.g., their cost)) in order to calculate optimal routes to a destination node. These LS routing protocols use topology-state update mechanisms to build a topology database at each node, typically conveying the topology status through flooding (flooding is defined as the broadcasting of control messages containing link/node status and reachablility information through every link on every node in the network).

OSPF uses link state advertisement (LSA), PNNI uses PNNI topology state elements (PTSE). Topology information in PNNI is distributed in PTSEs, which are encapsulated in PNNI topology state packets (PTSPs) and periodically flooded to other nodes in the domain through all available links. As with all LS protocols, both OSPF and PNNI use Hello messages to establish and maintain link adjacencies. Router/Switch nodes and links go up/down in the course of operation (due to fiber cuts, hardware/software failures, etc.); link state routing protocols employ a flooding mechanism to disseminate this "change of state" information throughout the autonomous system. Simply put, this means when a router gets a new LSA message, it sends that information out to all of its directly connected networks. Or, if one of the links on a router changes state or its cost, the router generates a new LSA, which is flooded/broadcast out to all of its ports. Unfortunately, congestion in LS protocols due to flooding of control messages (LSAs and PTSEs) has caused many problems in the past. It can arise for many different reasons and can result in widespread loss of topology database information and overload in flooding of topology database information. In some instances of network overload, failure and/or congestion, flooding mechanisms can overwhelm routing control processors and bring the network down. A number of data network outages have been reported by service providers where the recovery of the underlying LS protocols was inadequate.

Networks are being deployed in ever larger flat mesh networks with hundreds of nodes. For example, in the near future, it is anticipated that as many as 500-1000 nodes will be deployed as one autonomous system in an optical switching network. In such an environment, flooding as originally defined is clearly an impractical and unsustainable method. A node's control processor (even with multi-core processors) will become easily overwhelmed as failures occur and the time for the network to converge will take 100s of seconds, if not 1000s of seconds, which the customer will find unacceptable. Many flooding reduction methods have been proposed and implemented, but there are drawbacks to those techniques and so there is still room for improvement. An efficient protocol and topology is needed to make flooding efficient, thus enabling networks to scale to thousands of nodes. The problems associated with flooding are the single biggest reason inhibiting networks from scaling.

Standard bodies such as the Internet Engineering Task Force (IETF) and Asynchronous Transport Mode (ATM) Forum have recognized the problem with flooding and have standardized approaches to make it more efficient. The ATM Forum recommends the use of areas to divide a large network into smaller areas, which, in theory, confines the flooding to an area. The IETF also allows the use of areas and in addition, created the concept of the designated router. Two newer approaches have since been standardized that were originally intended for mobile ad hoc networks, but can be used anywhere flooding reduction is desired. One such approach OSPF-MDR (Mobile Ad Hoc Networks Designated Routers) generalizes the use of the designated router by allowing the selection a subset of nodes to functions as designated routers, with all such routers connected together in a connected dominating set. Routers use two-hop information to independently elect themselves as Mobile Ad Hoc Networks (MANET) designated routers, MANET Backup Designated Routers or MANET-Other routers.

Another approach employs the concept of multipoint relays (MPRs), called OSPF-MPR, where each node maintains a set of nodes called multipoint relays, which are a subset of one-hop neighbors whose connectivity covers the two-hop neighborhood. An MPR node is a node's one-hop neighbor which has been chosen to forward control packets. This approach also uses modified hello messages that convey two-hop neighborhood information to select the multipoint relays. The key problem with these approaches is that all nodes have to rerun these algorithms after they have received LSAs/TSEs, so the new backbone can take some time to be rebuilt. The use of "areas" have been found to increase and not reduce the amount of flooding, an informational RFC written by Mikkel Thorup documents some of the harmful effects of using OSPF areas, which include: peculiarities of area routing can result in "funny area routing"; areas are likely to increase information, especially if the number of border routers for a given area is bigger than the degree (number of incident links) for each internal router; simple link-failure can lead to an avalanche of distance changes flooding the network with the use of areas; and the use of "summarization" can lead to unintended infinite loops.

Approaches such as OSPF-MDR and OSPF-MPR require significant modifications to the OSPF standard where two new type-length-values (TLVs) are created: 1) A modified hello protocol that provides two-hop neighborhood information and 2) A new metric TLV. More importantly, all of these new messages have to get propagated throughout the network and get to every node where the algorithm has to be rerun and then the new flooding backbone is created. This is very inefficient; it can take hundreds of seconds in a large network where there are 100s of nodes. It would be much more desirable to have a mechanism that requires minimal changes to the existing standard. Secondly, it would be best if nodes close to the failure can dynamically repair the flooding backbone. The current methods require every node in the network to rerun the designated router selection algorithm with the slightest failure/change in the network topology. This results in the network taking a long time to converge, since all nodes have to first receive the update messages and then run the algorithm. It would be better if nodes closest to the fault only rerun the algorithm while all others are unaffected.

BRIEF SUMMARY OF THE INVENTION

In an exemplary embodiment of the present invention, a network operating method includes, upon achieving full adjacency of nodes in a network, determining a spanning tree at each node via a same algorithm; setting each link in the spanning tree at each of the nodes as a flooding link; checking at each of the nodes with neighboring nodes a link flooding status of each link in the network; and operating the network using the links in the spanning tree to exchange link state messages. The network operating method may further include exchanging messages between each of the nodes such that each of the nodes includes a topology of the network. The network operating method may further include, for mismatched links in the checking step, asserting a flooding link mismatch alarm. The algorithm may be Prim's algorithm. During the achieving full adjacency, opposing nodes on a particular link may be designated as a master node and a slave node. The network operating method may further include detecting a failed link of the links in the spanning tree; and automatically repairing the spanning tree by determining a new path between opposing nodes on the failed link. The network operating method may further include detecting a failed link of the links in the spanning tree; and, at the master node, automatically repairing the spanning tree by determining a new path between opposing nodes on the failed link. The network operating method may further include, for each failed link on the master node, constructing an explicit route from the master node to a node at an opposing end of the failed link; setting all links in the explicit route as links in the spanning tree if not already in the spanning tree; and sending a repair flooding link message on the links in the explicit route. The network operating method may further include repeating the constructing step and the setting step for all additional working links at the master node.

The network operating method may further include setting a timer for each working link at the master node; upon expiration of the timer, checking if at least one acknowledgement message has been received by the master node; if no acknowledgement messages are received, restarting the timer and resending the repair flooding link message; and if at least one acknowledgement message is received, repeating the determining step, the checking step, the setting step, and the operating step. The network operating method may further include, at each node receiving the repair flooding link message, if this is a terminating node in the explicit route, sending an acknowledgement message to a source of the repair flooding link message using a reverse path from the explicit route; and else, enabling the link from which the repair flooding link message was received as a link in the spanning tree. The network operating method may further include if a next link in the explicit route is broken, sending a failed acknowledgement message to the source of the repair flooding link message; else, forwarding the repair flooding link message to a next node in the explicit route. The network operating method may further include, at each node, constraining link state messages by sending the link state messages only on links in the spanning tree. The network operating method may further include automatically implementing the network operating method without user input.

In another exemplary embodiment, a link state routed network includes a plurality of nodes; a plurality of links interconnecting the plurality of nodes; and an algorithm operating at each of the plurality of nodes and configured to automatically define a spanning tree, to repair the spanning tree responsive to a fault, and to constrain link state message broadcast only to links in the spanning tree.

In yet another exemplary embodiment, a network operating method with a spanning tree flooding topology includes exchanging topology messages between a plurality of nodes in a network; upon achieving full adjacency of the plurality of nodes, executing Prim's algorithm at each of the plurality of nodes in the network thereby defining a spanning tree at each of the nodes; checking between the plurality of nodes to ensure each of the plurality of nodes has the same topology of the spanning tree; operating the network including sending link state messages only on links in the spanning tree; detecting a failed link in the spanning tree; and automatically repairing the spanning tree by determining a new path between opposing nodes on the failed link.

BRIEF DESCRIPTION OF THE DRAWINGS

The present invention is illustrated and described herein with reference to the various drawings of various exemplary embodiments, in which like reference numbers denote like method steps and/or system components, respectively, and in which:

FIG. 15 is a link and node status table for an exemplary node in the network of FIG. 3;

DETAILED DESCRIPTION OF THE INVENTION

Figure 1:
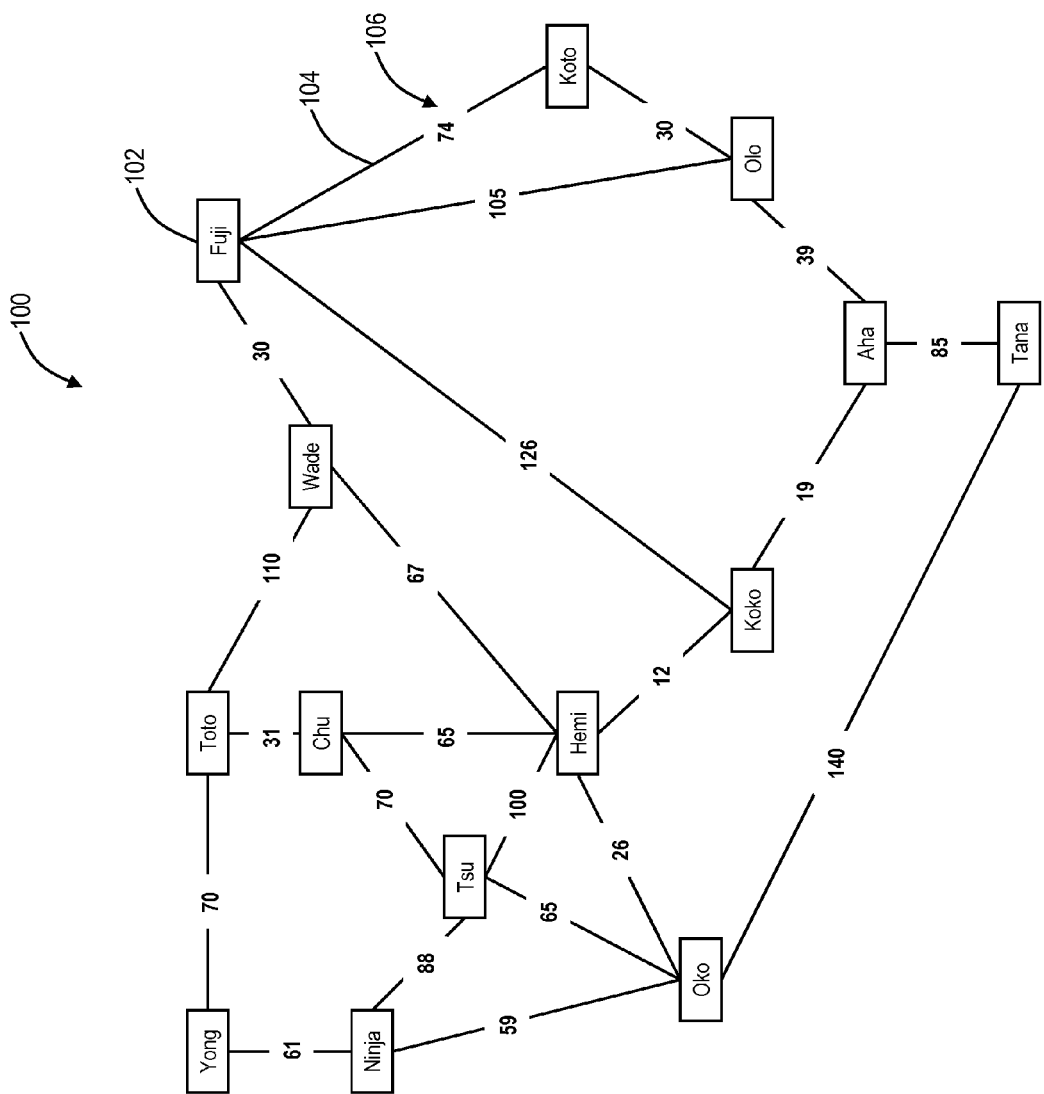
FIG. 1 is a diagram of an exemplary network with a plurality of nodes interconnected through a plurality of meshed links.

In various exemplary embodiments, the present invention creates an efficient topology (i.e., a flooding backbone) for distributing topology messages in link state routed networks and efficiently repairing that "flooding backbone" when a failure occurs. The present invention utilizes a simply method of maintaining and reconstructing the topology after a fault has occurred in the network. As described herein, flooding is a robust and simple mechanism to implement but is very inefficient in link state routed networks using protocols such as PNNI and OSPF. Flooding of link state updates entails broadcasting a link state update message in an OSPF network out of all interfaces except the one upon which it was received. If the node generates an LSA due to one of its interfaces, it broadcast the LSA out of all interfaces that are still up and running, and this process is repeated at each node, until all nodes in the topology have receives the update message, which leads to a vast number of redundant messages. The inefficiency of flooding is further exacerbated in that all LSA must be acknowledged; otherwise they are re-transmitted after a period of time expires. So, with the inherent redundancy of the flooding distribution algorithm becomes a disadvantage by creating extra traffic on the networks and needless processing of messages at each node.

Instead of using the existing flooding mechanism, where every node floods new LSAs, the present invention makes use of a spanning tree connecting nodes in a cluster which is used to distribute topology information, i.e. the flooding backbone. A spanning tree reduces the flooding topology by roughly 50% vs. flooding on all links. This spanning tree and associated links represent the "flooding backbone," i.e. where all control messages are only broadcast on the spanning tree backbone. Any spanning tree algorithm, e.g. Prim's algorithm, can be used to build the tree and the algorithm is only performed once when the tree is first constructed. After that, any errors that occur in the network do not result in every node re-running Prim's algorithm to rebuild the spanning tree flooding backbone. Instead, the present invention includes an algorithm to repair the spanning tree, i.e. where all nodes closest to the failure repair the failure, and the vast majority of the network is unaffected. LSAs are still distributed, but the flooding backbone is quickly repaired.

Further, there is minimal impact to the existing link state protocols. All that is required are simple messages, appended to a Hello message of routing protocols such as OSPF and PNNI, indicating to the node upstream or downstream to "Connect to the Backbone". Another message is used to announce node status as one of five cases (a stub node, a spanning tree node, a multi-flooding link node, a dead-end node or an isolated node), when Prim's algorithm is first run, or after a failure has occurred. These messages and their use are described herein. Once a fault has occurred in the network, e.g. a link between two nodes has been severed, the reconnect algorithm works whereby each node knows in advance if it is responsible for fixing the link failure, if not, it pushes the reconnecting of the backbone to next node upstream or downstream, always trying to move it to the stub nodes, as much as possible, as will be illustrated below.

The present invention includes an algorithm/protocol that repairs/fixes a spanning tree topology by finding the closest stub node from the point of link/node failure(s) and having the stub node repair the spanning tree. This discovery is the basis of this algorithm and it avoids the need to re-run the spanning tree algorithm to fix it when a failure(s) occur, which would take much longer and consume more bandwidth and processing before it all converges to a new topology.

A spanning tree topology is the best method of interconnecting 100s and 1000s of nodes because it is loop-free, there is a straight-line between any two nodes and there is a minimum number of links used to interconnect all the nodes in a network, there is no better way to interconnect a collection of nodes. It is better than OSPF-MDR, since it uses less links as the flooding topology. Furthermore, with the introduction of multi-core processors, software can be modified so that an individual processing core handles all routing and signaling protocol messages. In this environment, the priority of routing messages should be as high as signaling messages. Once done, using a flooding backbone will ensure all nodes (even up to a 1000s or more) will rapidly get all routing message updates.

The spanning tree topology is a great way to interconnect nodes, what is bad about spanning tree is the protocol itself. BPDUs (bridge protocol data units) are large messages which must be exchanged with all nodes to determine the root node of the tree. This consumes a lot of bandwidth and takes and long time to complete. The present invention solves this problem, since the spanning tree is no longer executed after it has been built, without losing the advantage of using a spanning tree for flooding. Instead, the present invention only involves the necessary nodes to quickly and efficiently fix the tree. The algorithm is dormant until there is a failure in the network, exactly what's desired. The present invention is also highly robust, multiple errors can occur on multiple nodes and/or links and the spanning is efficiently and correctly fixed.

Assuming there are multiple simultaneous failures in the network, depending on where the failures are, they are fixed in parallel with one another, making it very efficient. All the nodes in the network do not need to be involved to fix the tree; a small number of local nodes to the failure(s) are involved to fix the failure(s). Other nodes further away from the failures do not need to interact with one another. The present invention is much simpler than OSPF-MDR (less parameters and data structures) with very little overhead and simple messaging, and a much simpler algorithm. Further the present invention efficiently scales, i.e. the size of the network does not matter, and it is conceivable that this could work with a 10K node network. Also, the present invention is very quick and efficient, with small number of messages and involving a minimum number of nodes.

Referring to FIG. 1, in an exemplary embodiment, a network 100 includes a plurality of nodes 102 interconnected through a plurality of meshed links 104. Each of the meshed links 104 include a weight 106 that is used in determining a spanning tree through the network 100. The plurality of nodes 102 can include networking devices with multiple output lines over the links 104. These networking devices are configured to utilize OSPF, PNNI, OSRP, and the like. For example, the plurality of nodes 102 can include a multi-service optical switch, cross-connect, router, and the like. The meshed links 104 can include optical signals transmitted over fiber optic cables. The weights 106 can be an administrative weight that defines administrative cost or weight, subject to a set of user-defined constraints. Specifically, the weights 106 can be a metric related to the cost of a particular link 104 with a lower value significant of a more ideal link.

Figure 2:
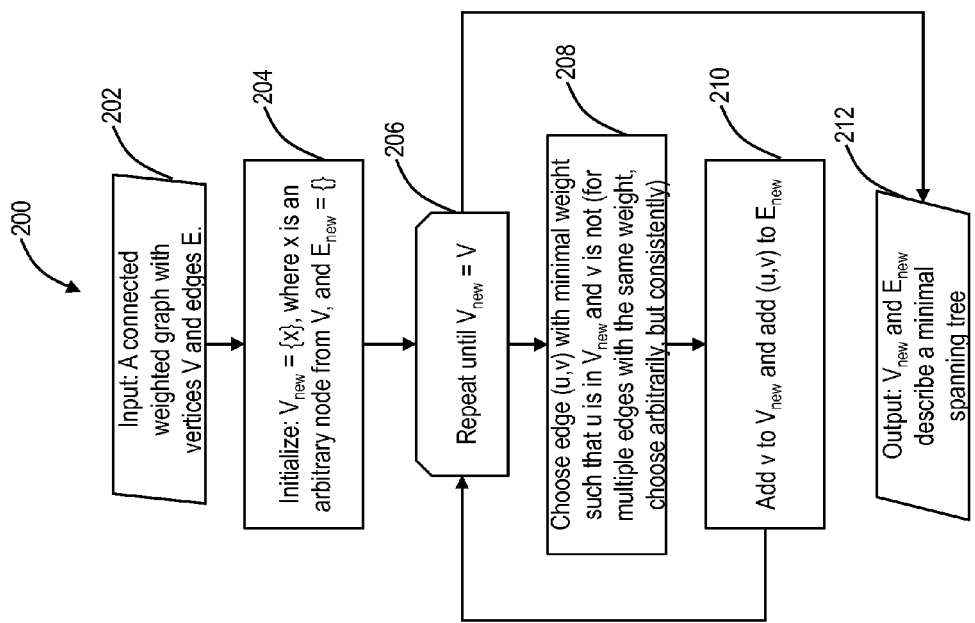
FIG. 2 is a flowchart of an exemplary implementation of Prim's algorithm for creating a spanning tree in the network of FIG. 1.

Referring to FIG. 2, in an exemplary embodiment, an implementation of Prim's algorithm 200 is illustrated for creating a spanning tree in the network 100. Prim's algorithm 200 continuously increases the size of a tree starting with a single vertex until it spans all of the vertices. The algorithm 200 is input with a connected weighted graph with vertices, V, and edges, E (step 202). Specifically, V can represent each of the plurality of nodes 102 and E can represent each of the links 104 and associated weights 106. The algorithm 200 is initialized with $V_{new}=\{x\}$, where x is an arbitrary node 102 (i.e., a starting point) from V, and $E_{new}=\{\ \}$ (step 204). The algorithm 200 is repeated until $V_{new}=V$ (step 206), i.e. until all of the nodes 102 are spanned. The algorithm 200 chooses an edge (u, v) with minimal weight 106 such that u is in $V_{new}$ and v is not (if there are multiple edges with the same weight, choose arbitrarily but consistently) (step 208). The algorithm 200 adds v to $V_{new}$ and (u, v) to $E_{new}$ (step 210). Once complete through V, the algorithm 200 outputs $V_{new}$ and $E_{new}$ thereby describing a minimal spanning tree (step 212). In addition to Prim's algorithm 200, other methods are also contemplated by the present invention for defining a spanning tree through the network 100, such as, for example, a manually defined tree, Borůvka's algorithm, Kruskal's algorithm, and the like. The present invention contemplates defining this spanning tree only once and subsequent changes due to failures, topology changes, etc. are handled through a reconfiguration of the initially created spanning tree. Note, in addition to implementing an automatic algorithm to define the spanning tree through the network 100, the present invention also contemplates a manually defined spanning tree that is determined by a user.

Figure 3:
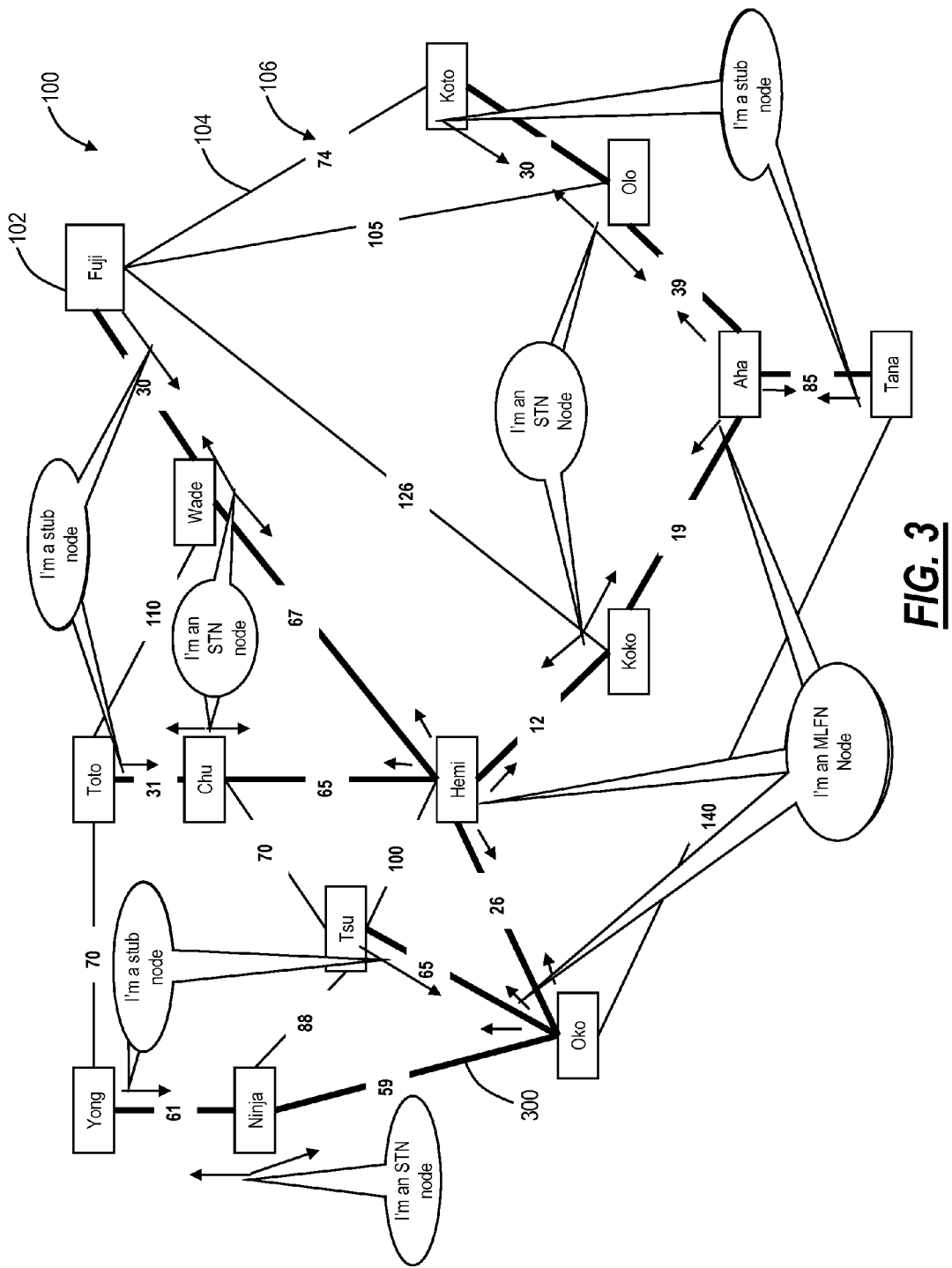
FIG. 3 is a diagram of a spanning tree used as a flooding backbone in the network of FIG. 1.

Referring to FIG. 3, in an exemplary embodiment, the network 100 is illustrated with a spanning tree 300 defined through the links 104. The spanning tree 300 was created by utilizing the algorithm 200 on the network 100. The present invention utilizes the spanning tree 300 as a flooding backbone for propagating control messages such as LSAs/PTSEs across the network and the other links 104 not part of the spanning tree 300 do not flood link update messages. The network 100 includes spanning tree links which are the links 104 that are part of the spanning tree 300 used to flood messages throughout the network, non-spanning tree links which are the links 104 that are not part of the spanning tree 300. The non-spanning tree links inhibit messages from being flooded onto the network; they are not part of the spanning tree 300, but may become part of the spanning tree 300 in the event of a failure or topology change. These links are completely functional with the exception that they do not participate in flooding of messages, however, they will receive any control; messages sent to them. They do not flood messages, nor do they receive messages, since all spanning tree links are bi-directional.

Once links 104 on a particular node 102 have been configured to be flooding links or not, each node 102 evaluates what type of node it is, which can be one of five possibilities: a stub node, spanning tree node, multi-link flooding node, dead-end node, and isolated node. A message is sent by piggybacking on Hello messages informing each neighbor on the spanning tree 300 links as to its status, that is whether it is a stub, spanning tree, multi-link flooding node, or dead-end node. Isolated nodes cannot inform neighbors. A stub node is a node with only one spanning tree link connected to it, but it has one or more non-spanning tree links connected to it. For example, in the example of FIG. 3, the nodes 102 at Yong, Toto, Tsu, Fuji, Tana, and Koto are stub nodes. The stub nodes announce they are stub nodes to their neighbors only along spanning tree 300 links. These messages will traverse the entire tree eventually discarded by a stub node that receives them. By traversing the entire tree, each node learns the hop count to a stub node, the hop count in the stub node notification message is incremented by each node in the network as the message is received. A multi-link flooding node is a node that has multiple flooding spanning tree links and/or one or more non-spanning tree links For example, Hemi, Koto, Ninja, Chu, Oko, Wade, Olo, and Aha are multi-link flooding nodes. A spanning tree node is a node with two flooding links, nodes Ninja, Chu, Wade, Olo and Koko are spanning tree nodes. A dead-end node is a node with only one spanning tree link connected to it, and it has no other links (spanning tree or otherwise) connected to it. Finally, an isolated node is node with no links connected to it, i.e. it is completed severed from other nodes in the network 100. When a node becomes isolated, it will generate an isolated node alarm.

After the initial set-up, the spanning tree 300 setup is never executed again. So, in the event of link 104 failure(s), nodes 102 at the point of failure(s) and the neighbors of the node 102 where the links 104 failed work together to find the closest stub node in the network 100. The stub node is a node 102 with only one active spanning tree-link, but with one or more additional links currently not part of the spanning tree 300. The stub node will fix the spanning tree by sending a RTJ (Request to Join) Message by properly selecting one of the links not part of the spanning tree 300. Both nodes 102 over this link 104 will now make it part of the spanning tree 300. When a failure occurs, the spanning tree algorithm is not re-run; instead the present invention repairs the spanning tree 300 by sending an RTJ. The present invention tries to find the closest stub which uses the RTJ message to repair the tree 300. Nodes 102 closest to the failure work in collusion with one another (through simple messages) to find the closest stub node from the point of the link failure. The stub node will repair the spanning tree 300 by issuing a Request to Join (RTJ) message to a lowest weighted link that is currently not part of the spanning tree 300. This tells the node 102 on the other end to make this link a flooding link i.e. it will now be a part of the spanning tree 300, both sides will mark this link as a spanning tree link and will henceforth be used for flooding.

A node 102 other than a stub node i.e. a multi-link flooding node that receives an RTJ message simply forwards the RTJ message to the closest stub node in the network 100. If it knows one of its neighbors is a stub node, then forward the RTJ to that node, otherwise it is forwarded across the link from which it is known to be closest to a stub node. That node will then forward the RTJ message across a link to a node that is closest to a stub until it finally is received by a stub node and the repair is made. Two nodes 102 reacts to a local failure i.e. a failure on one of its links by knowing in advance which node is responsible for fixing the failure i.e. finding the closest node and also updating its status to his neighbor(s) and/or issuing an RTJ, RTJ_ARB, STN_ARB or MLFN_ARB messages depending on what type of failure(s) occurred.

New messages that are part of the present invention can be piggybacked in the "Options" area of OSPF/PNNI Hellos and are differential messages, i.e. issued on demand when a failure on one or more links occur in the network or when node status types change. In an exemplary embodiment of the present invention, a node may receive any one of eight messages from other nodes that must be processed: RTJ, RTJ_ARB, SNN (Stub Node Notification), MLFNN (Multi-Link Flooding Node Notification), STNN (Spanning tree node notification), STN_ARB, MLFN_ARB and DENN (Dead End Node Notification). The RTJ is sent by a stub node across a link that is not part of the spanning tree backbone to make both ends designate the link as a spanning tree flooding link. The RTJ message can be generated by a stub node, spanning-tree node or a multi-link flooding node, but it is the stub node that sends the RTJ to another node along a link that is currently not a flooding link i.e. a "non-spanning tree" link, in order to now make that link a spanning tree flooding link. The node that receives the RTJ message will not acknowledge the RTJ message, it will accept it and mark the link as a flooding spanning tree link going toward the node that sent the message and the node that sent the message will mark that link as a spanning tree flooding link as well.

The RTJ_ARB message is issued when simultaneous failures occur and is recognized when an RTJ is received over a link that was just made a flooding link and its simultaneous events counter has not expired. The RTJ_ARB is sent between nodes in the event of simultaneous failures, which means one of the two nodes will have to take further action to additional failure that occurred. Each node sends a RTJ_ARB message identifying it's Node_ID, all Node_IDs are unique, so there will be a winner, e.g. a lower Node_ID can win over a higher Node_ID. The node on the other end receiving the RTJ_ARB message will also issue a RTJ_ARB message with the same content about itself. Each node compares the two pieces of information, the node that wins the arbitration is the node that will fix the spanning tree. The node that wins the arbitration will behave as if an RTJ message was received. If it is a stub node, it will fix the failure by selecting a new flooding link. If not, the RTJ is forwarded to the closest known stub node.

The SNN notifies a neighbor on the spanning tree link that the node is a stub. As mentioned, this SNN message traverses the entire tree where it is eventually discarded by a stub node. The SNN is the only message that traverses the entire flooding tree, all other messages only go to their immediate flooding link neighbor. The DENN notifies a neighbor on an ST link that the node is a dead-end node. The DENN is a notification that the node has only one link to/from the node and that link is an spanning tree flooding link. A node could have been a stub node and assume it had one non-active flooding link go down, the node will recognize that it has become a dead-end node and issue a DENN message through all spanning tree flooding links. The neighbor receiving this message will no longer forward an RTJ message to the node that has become a dead end node.

Additionally, the present invention can include additional messages such as a Multi-Link Flooding Node Notification (MLFNN), STN_Arbitration (STN_ARB), and MLFN_Arbitration (MLFN_ARB) messages. The MLFNN is a message used to inform all neighbors that a node is a multi-link flooding node, and it is only issued on flooding links and goes no farther than its immediate neighbor. The STN_ARB is issued by two spanning tree node to one another over a flooding link. It is used by both nodes to determine which node will fix a failure on the flooding link between them. Each node sends its Hop_Count to a stub of the other link on its node and its Node_ID. The node that is closest to a stub will know it is responsible for fixing the link if it fails. If both far-end links are equal distant to a stub, then the node with the lower Node_ID fixes the failure. The MLFN_ARB is issued by a node that receives an MLFNN message and the node is also an MLFN. Each node sends its Hop_Count of one of the other flooding links that is closest to a stub. The node that is closer to the stub is responsible for fixing a failure on the flooding link between them i.e. the link over which the MLFN_ARB was issued.

With respect to FIG. 3, the following nodes announce they are stubs to all their neighbors on all ST links only via SNN messages: Yong, Toto, Tsu, Fuji, Koto, and Tana. The SNN messages will traverse the entire network 100. As each node receives the SNN it will increment the hop count and then forward it over all other flooding links, eventually SNN messages are discarded by a stub node that receives the message.

Nodes Ninja, Chu, Wade, Koko and Olo are spanning tree nodes. They announce to both neighbors they are STN nodes. These messages are not propagated any further. Oko, Hemi and Aha are MLFN nodes, and they send MLFNN messages. The MLFNN message between Hemi and Oko will trigger an MLFN_Arb to determine which node will fix link 26 if it fails.

Figure 4:
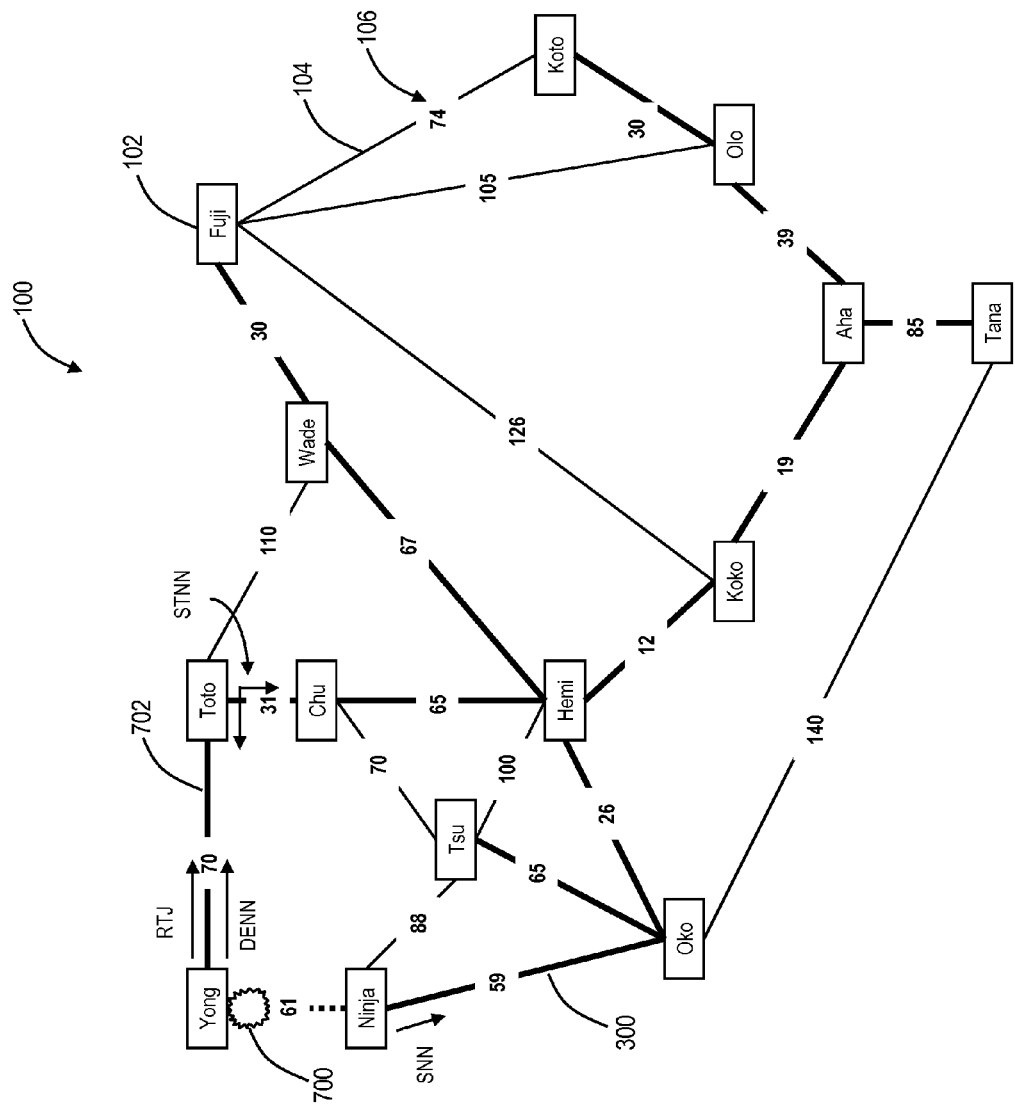
FIGS. 4-12 are diagrams of exemplary failure scenarios and resultant operations utilizing the present invention.
Figure 5:
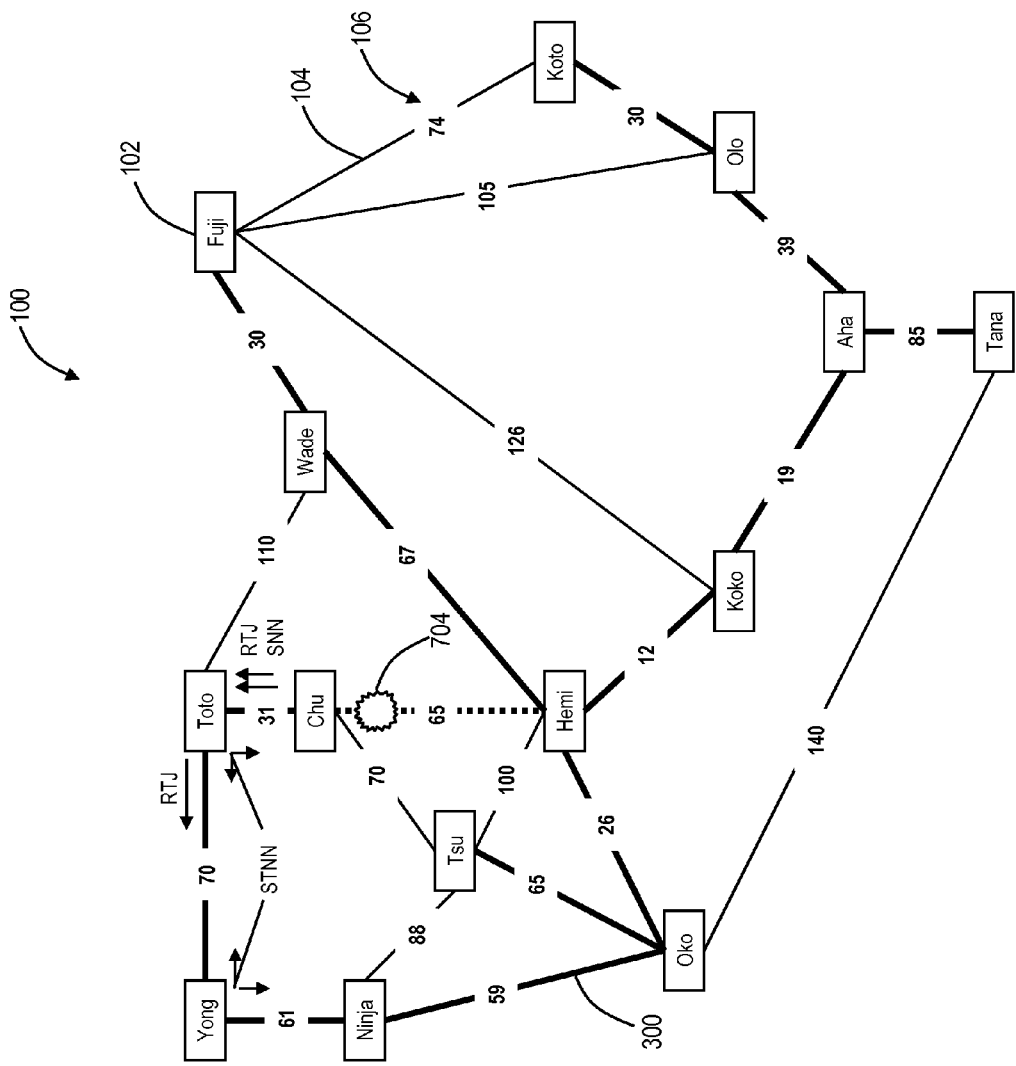

Referring to FIGS. 4-12, in various exemplary embodiments, the network 100 is illustrated with different failure scenarios showing operation of the present invention to repair the flooding backbone. FIG. 4 illustrates a single link failure 700 on a spanning tree link between the nodes 102 at Yong and Ninja. Ninja does not repair the backbone 300, since he knows that Yong is a stub node, but he announces that he is now a stub node to Oko via SNN. Yong sends a RTJ message to Toto to make a link 702 a flooding link since Yong was a stub node, thus repairing the backbone 300. Yong also announces he is now a dead-end node via DENN. Toto announces he is a spanning tree node via a STNN message. FIG. 5 illustrates another single failure 704 on a spanning tree link between the nodes 102 at Chu and Hemi. Here, Chu becomes a stub node, and sends a RTJ message to Toto since Toto is a stub node. Hemi does nothing since he knew Chu was an STN and the link toward Chu is not a dead-end path i.e. a path that doesn't lead to a stub instead a dead-end node. Toto sends a RTJ to Yong and Toto is no longer a stub node. Both Toto and Yong become spanning tree nodes and announce this via an STNN message.

Figure 6:
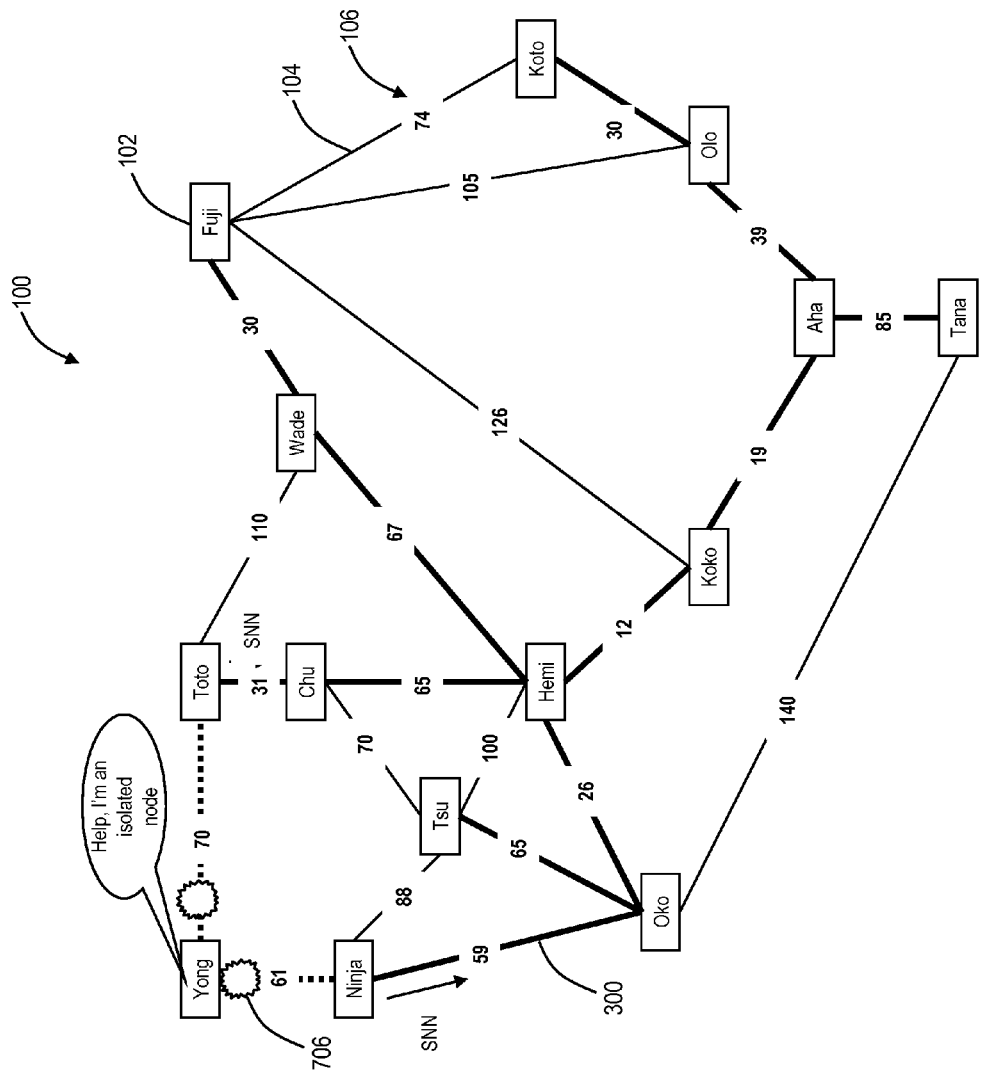
Figure 7:
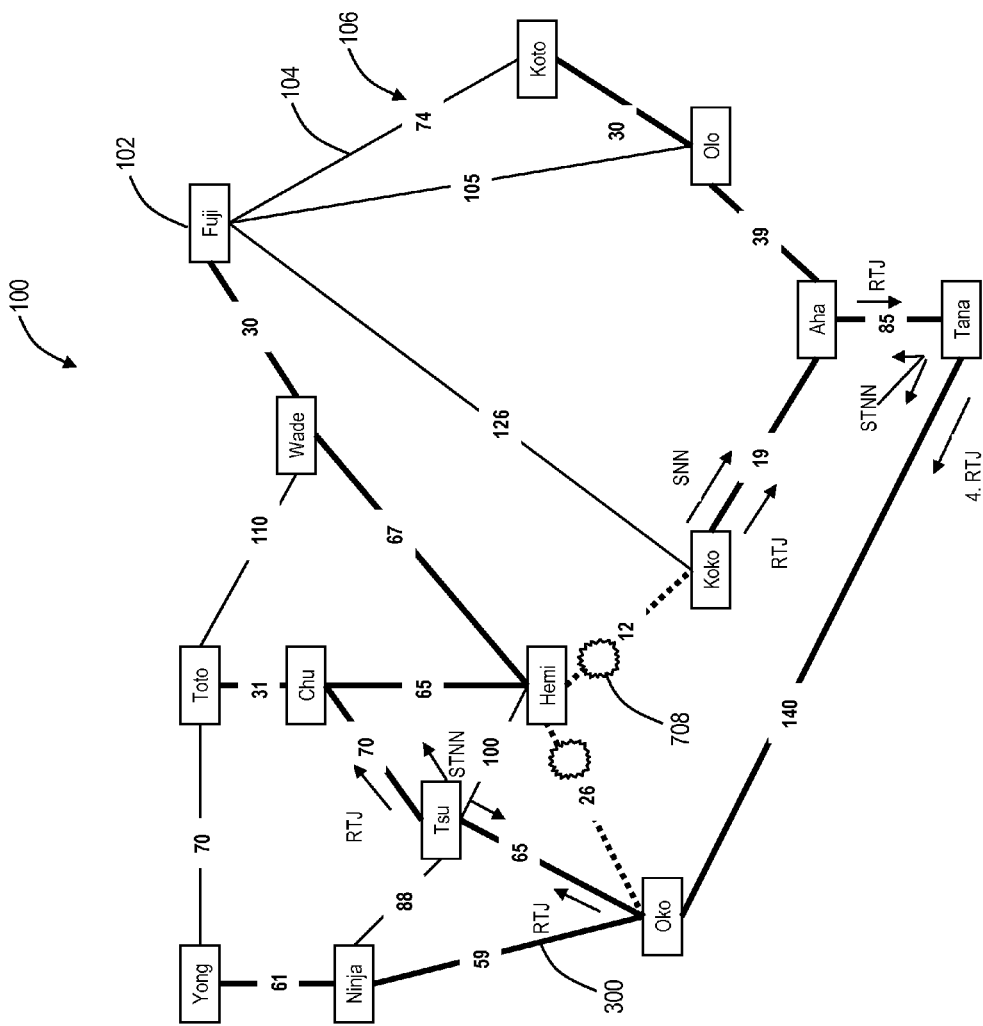

FIG. 6 illustrates a dual simultaneous link failure 706 isolating the node 102 at Yong. Previously, Yong was a stub node, but is now isolated. Ninja does not make any requests to connect to the backbone 300, since he is still connected to the spanning tree flooding backbone 300 and he knew that Yong was a stub node. Ninja announces that he is now a stub node. Toto does nothing, since he is a stub node and the link that broke was not part of the flooding backbone 300. Also, Toto is still connected to the backbone 300. Yong sets off alarm indicating he is now a isolated node. FIG. 7 illustrates another dual simultaneous link failure 708 between Hemi and Oko and between Hemi and Koko. Hemi and Oko are multi-link flooding nodes and remain multi-link flooding node after the failures 708. The failure between Oko and Hemi is fixed by Oko since it was known after they issued MLFN_ARB messages to one another after the tree was set up that Oko is closer to a stub (1-hop) via the link to Tsu. Oko knows to send an RTJ to Tsu which sends an RTJ to its lowest weighted link toward Chu, which fixes the spanning tree. Tsu then announces he is a spanning tree node via an STNN message. Also, the failure between Koko and Hemi is fixed by Koko, which was determined after both sides exchanges node statuses. Koko knows to issue an RTJ on its flooding link toward Aha. Aha receives the RTJ and knows that Tana is a stub so Aha forwards the RTJ to Oko fixing the spanning tree backbone 300. Tana now becomes a spanning tree node, so it issues an STNN message across all of its flooding links.

Figure 8:
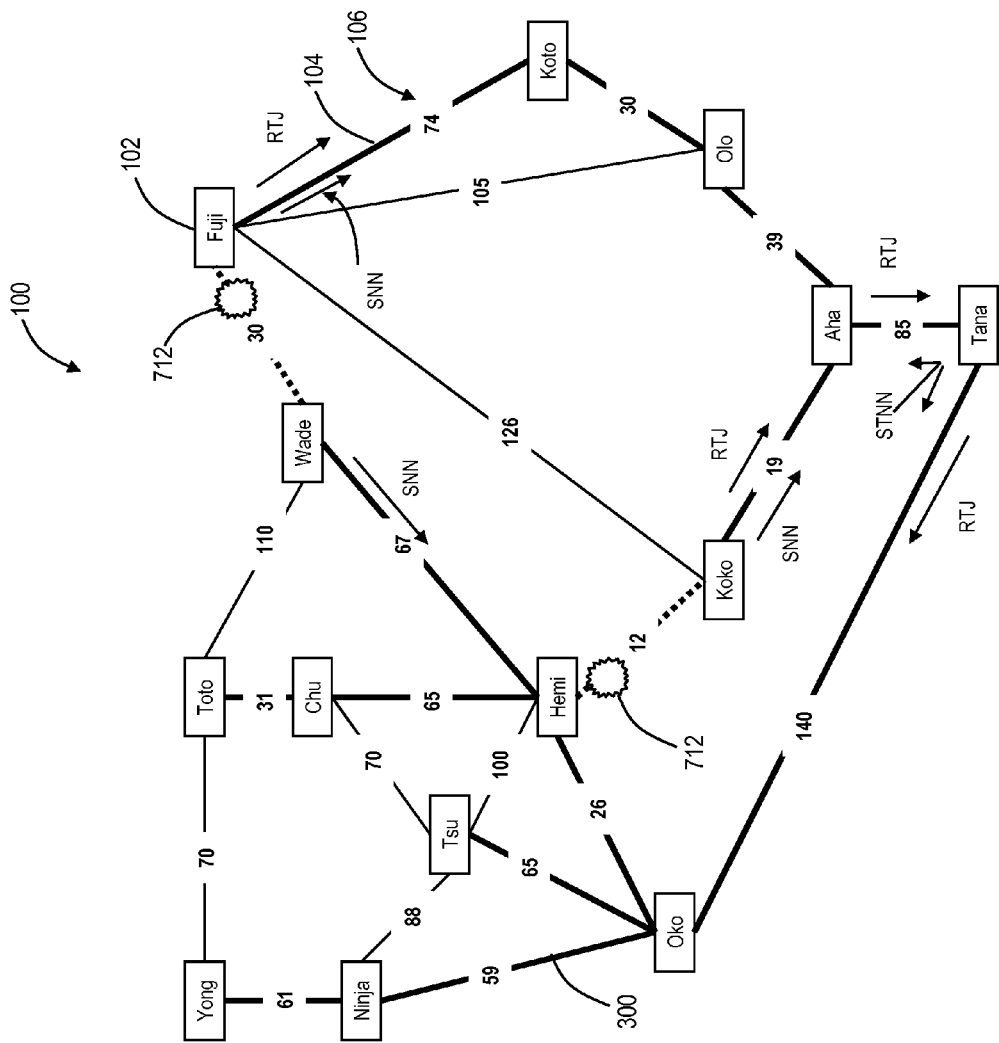
Figure 9:
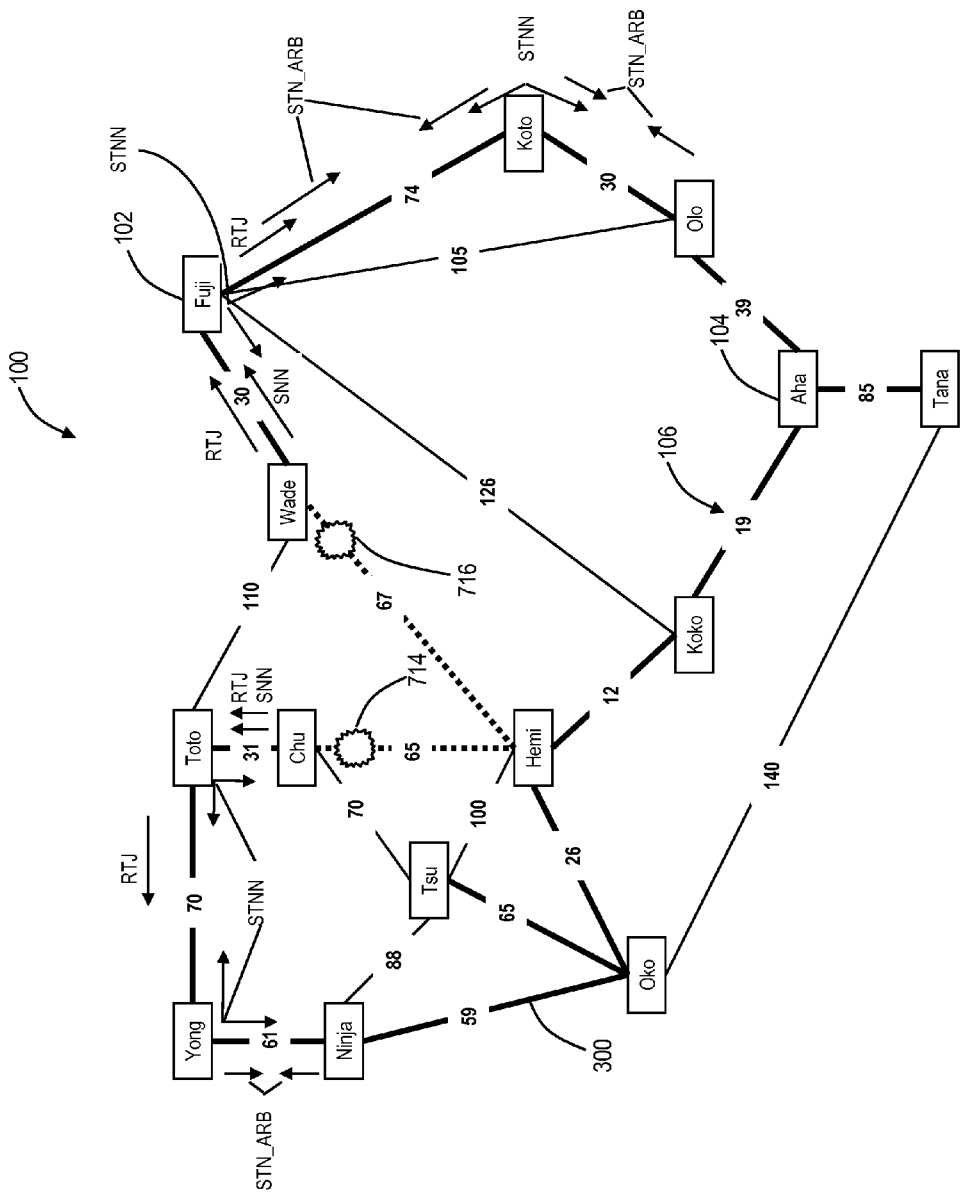

FIG. 8 illustrates a double failure 710, 712 that severs the backbone 300 into two segments. Here, Koko sends a RTJ message to Aha, since he was a spanning tree node and the other flooding link is not a dead-end path. Aha forwards the RTJ message to Tana, since he knows that Tana is a stub. Tana sends RTJ to Oko to establish a link. Fuji sends a RTJ message to Koto since he is a stub to establish a flooding link, and its the lowest weighted link. Fuji, Wade and Koko announce they are stubs. Tana also announces it is a spanning tree node to its flooding link neighbors via an STNN message. FIG. 9 illustrates another double failure 714, 716 affecting the links 104 between Wade, Hemi, and Chu. Wade and Chu send RTJ messages to Fuji and Toto, respectively and Wade and Chu announce they are now stub nodes. Toto sends a RTJ message to Yong and announces he is a spanning tree node. Yong announces he is an STN node as well. Yong and Ninja will issue STN_ARB messages to one another to determine who is closer to a stub and therefore responsible for fixing the failure on the link between them. Fuji sends a RTJ message to Koto since that is the lowest weighted link and announces to Koto and Wade that Fuji is an STN node. Fuji and Koko will also do an STN_ARB to determine which of them is closer to a stub. Fuji is closer. Likewise, Koto and Olo will exchange STN_ARB messages between them.

Figure 10:
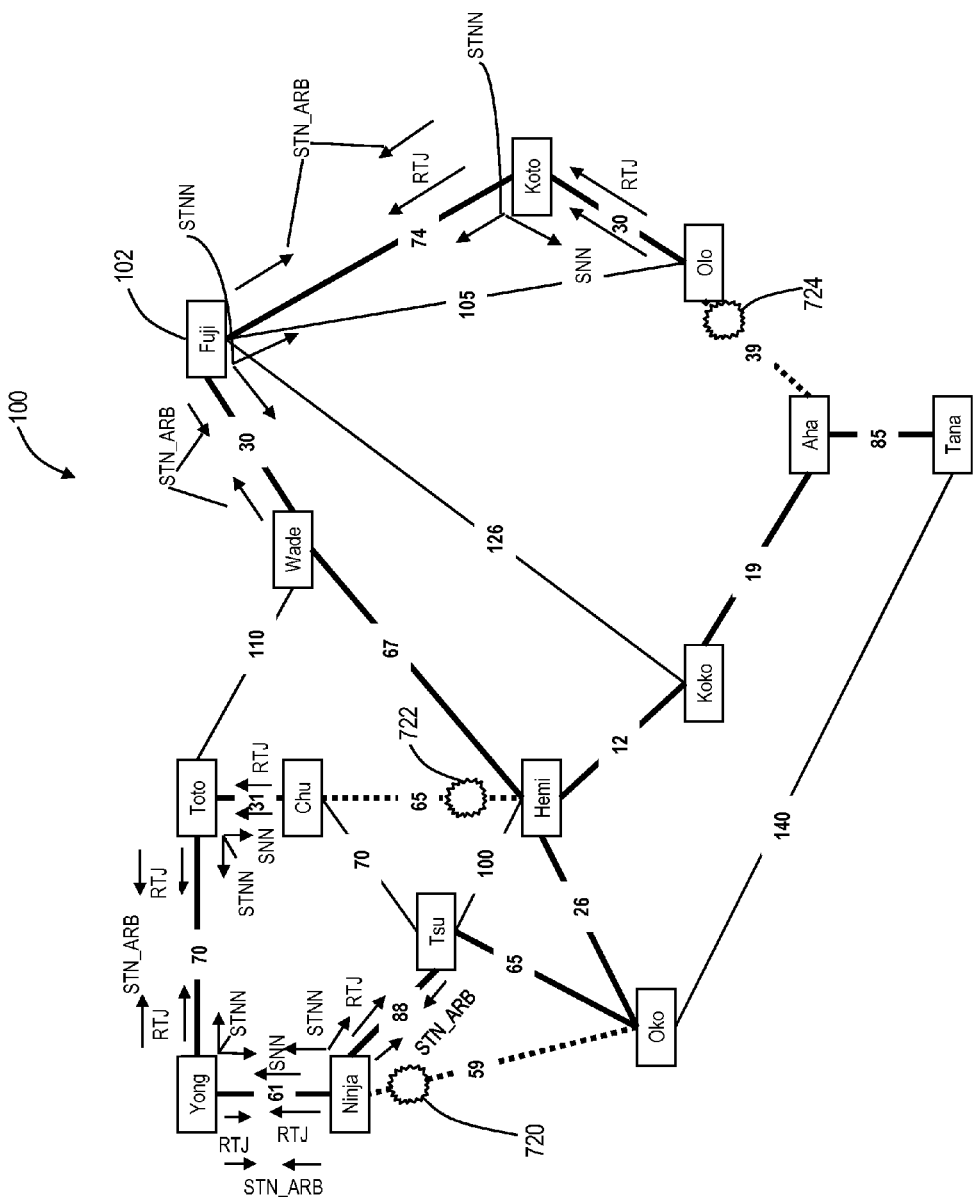
Figure 11:
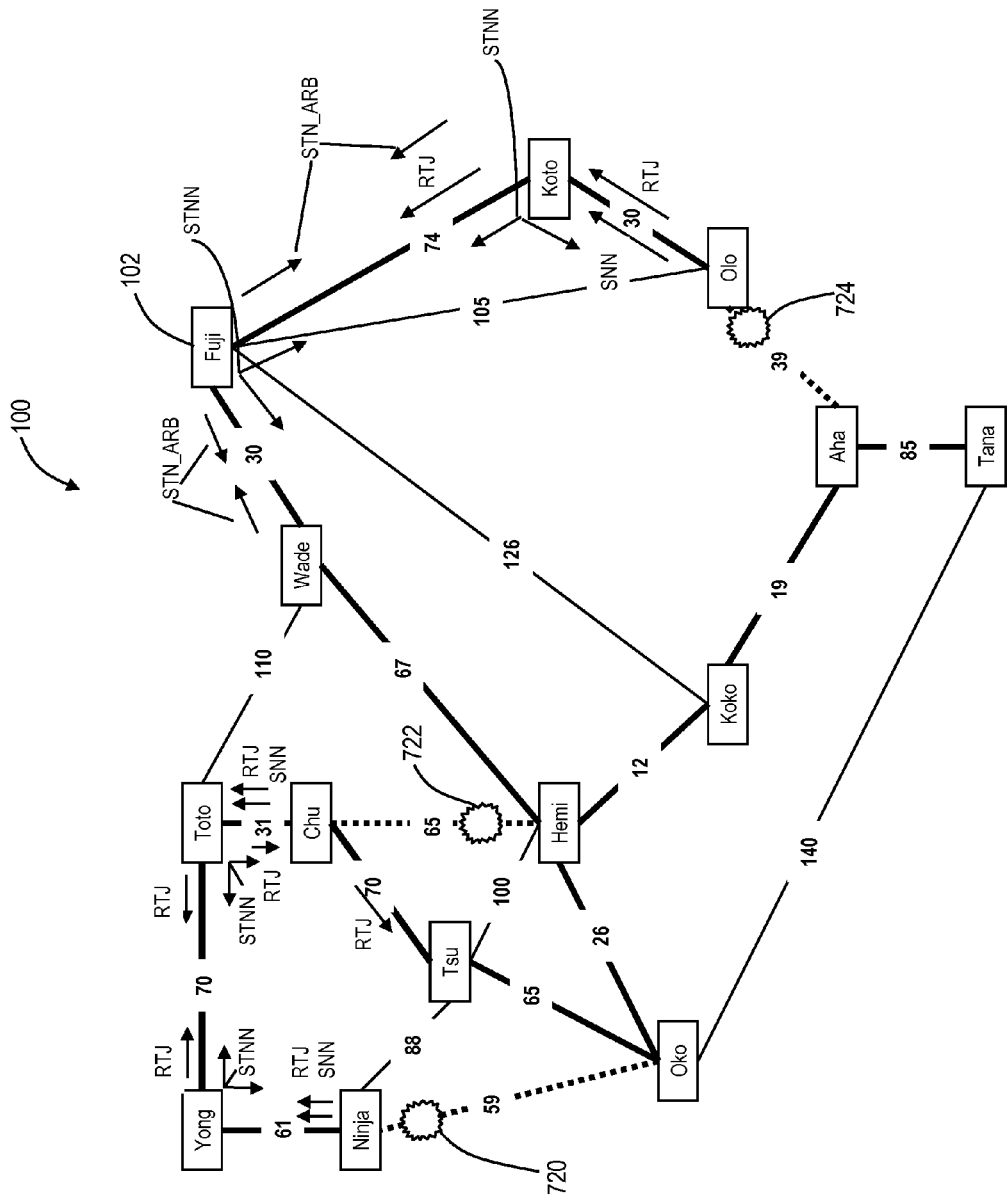
Figure 12:
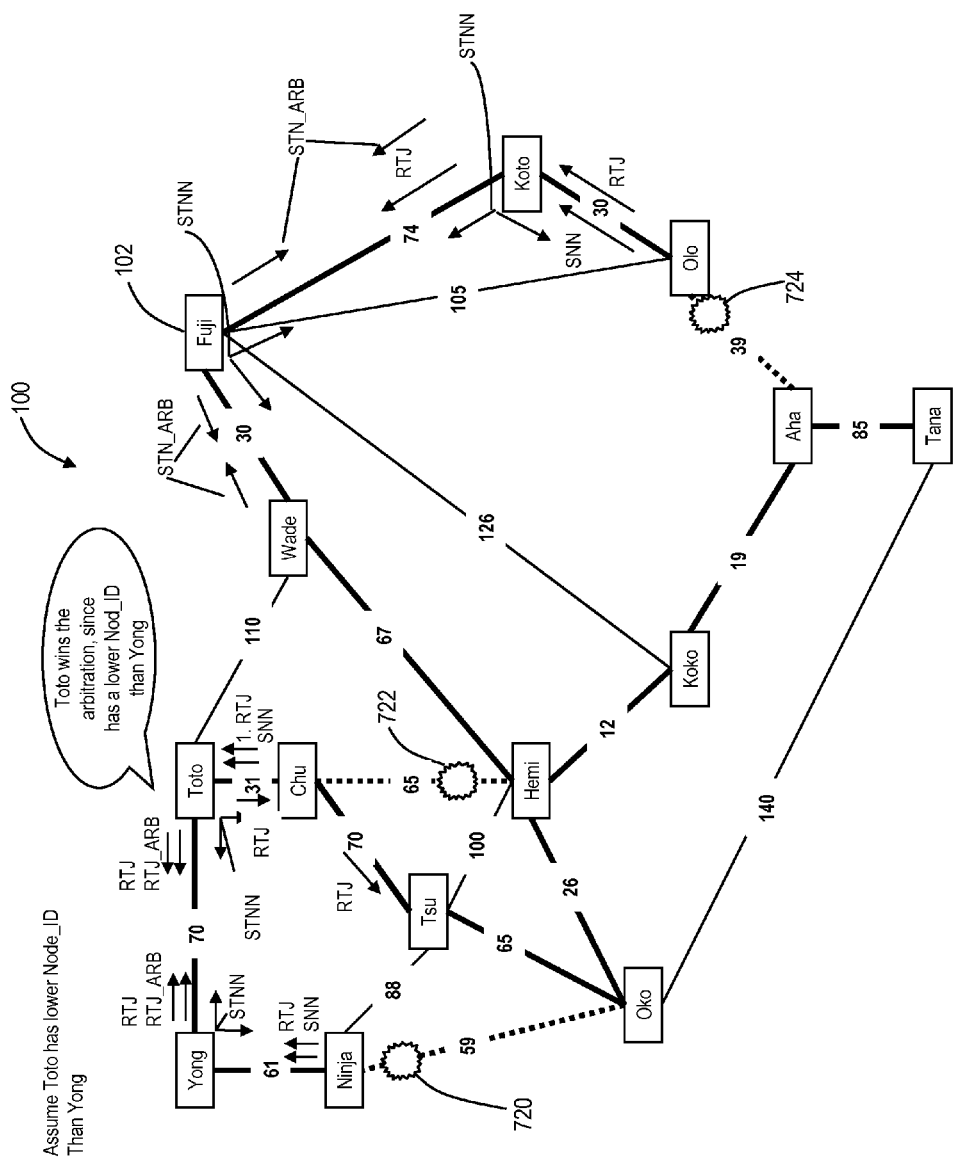

FIGS. 10 and 11 illustrate triple failures 720, 722, 724 between nodes Ninja and Oko, Chu and Hemi, and Olo and Aha, respectively. FIGS. 10 and 11 cover different timing case of the failures 720, 722. FIG. 10 assumes that the failure 720 occurs before the failure 722. The failure 724 at Olo will not affect the failures 720, 722 at Ninja and Chu, so it will resolve accordingly, and can happen any time relative to the other two failures. For the failure 724, Olo sends a RTJ message to Koto, and Olo announces he is a stub node. Koto sends the RTJ message to Fuji and Koto announces he is an STN node. Fuji announces he is now an STN node, and the link between Fuji and Koto becomes a flooding link on the backbone 300. Hemi and Oko will not Attempt to fix the backbone 300, since both Ninja and Chu are spanning tree nodes and they are closer to stub nodes. The outcome of how Ninja and Chu fix the spanning tree backbone 300 is dependent on the timing of these events relative to one another. Here, Ninja sends a RTJ message to Yong and Ninja announces he is an STN node. Yong sends a RTJ message to Toto and Yong announces he is an STN node. Then the failure 722 occurs with Chu sending a RTJ message to Toto and announcing he is a stub. Toto sends a RTJ to Yong and announces he is an STN node. Yong sends a RTJ to Ninja and finally Ninja sends an RTJ to Tsu and announces he is an STN node. FIG. 11 assumes the failure 722 occurs before the failure 720, and the corresponding activity is illustrated. FIG. 12 illustrates the failures 720, 722 occurring simultaneously. Here, Yong and Toto recognize that both ends sent an RTJ, which means another failure that occurred and one of the nodes needs further action to fix the failure. The RTJ_ARB message is used to resolve who fixes the failure. For example, Toto can win because its link has a weight of 31 which is lower than Yong's link weight of 61.

Figure 13:
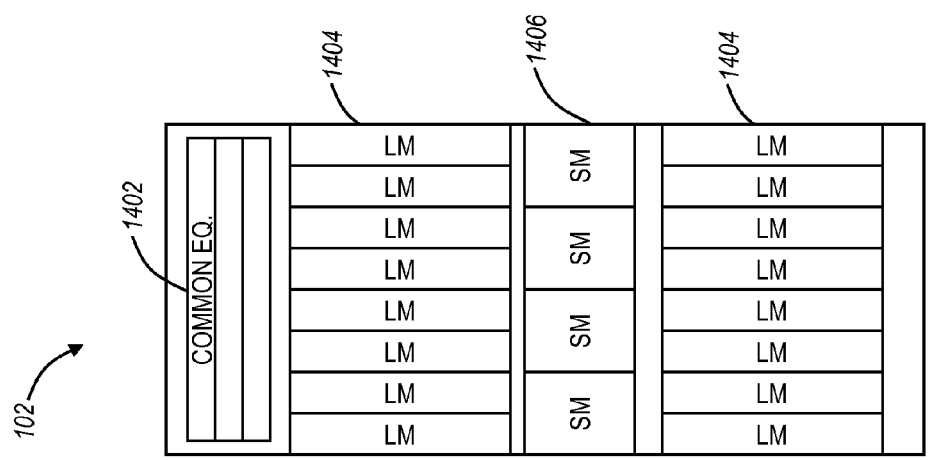
FIG. 13 is a diagram of an exemplary node configured to implement the systems and methods of the present invention.

Referring to FIG. 13, in an exemplary embodiment, a block diagram of a node 102 in the network is illustrated. For example, the node 102 can be a network element that functions as a multi-service, multi-protocol switching device. For example, the node 102 can include an optical switch network element (NE) that can consolidate the functionality of a multi-service provisioning platform (MSPP), digital cross connect (DCS), Ethernet and Optical Transport Network (OTN) switch, into a single, high-capacity intelligent switching system. Also, the node 102 can be an Internet Protocol (IP) router and the like. Those of ordinary skill in the art will recognize FIG. 13 is an exemplary illustration of high-level components and that the node 102 can include additional components omitted for simplicity. Additionally, the present invention contemplates use in any link state routed network with the nodes 102 utilizing any known configuration, and FIG. 13 is merely an exemplary illustration of a configuration.

Generally, the node 102 includes common equipment 1402, line modules 1404, and switch modules 1406. The common equipment 1402 can include power, a control module, operations, administration, maintenance, and provisioning (OAM&P) access, and the like. For example, the common equipment 1402 can connect to a management system (e.g., NMS, EMS, OSS, etc.) through a data communications network. Additionally, the control module can be configured to operate a control plane (e.g., OSRP, PNNI, etc. utilizing OSPF) and the systems and methods described herein with regard to operating a constrained flooding backbone. The line modules 1404 are communicatively coupled to the switch modules 1406, such as through a backplane, mid-plane, or the like. The line modules 1404 are configured to provide ingress and egress to the switch modules 1406, and are configured to provide interfaces forming the links 104 described herein with respect to the network 100. For example, the line modules 1404 can include optical transceivers, such as, for example, 2.5 Gb/s (OC-48/STM-1, OTU1), 10 Gb/s (OC-192/STM-64, OTU2), 40 Gb/s (OC-768/STM-256, OTU3), etc. The line modules 1404 can include dense wave division multiplexed (DWDM) interfaces, short reach interfaces, and the like, and can connect to other line modules 1404 on remote NEs, end clients, and the like. Specifically, the line modules 1404 can provide a physical implementation of the plurality of meshed links 104. The switch modules 1406 are configured to switch services between the line modules 1404 internal to the node 102. For example, the switch modules 1406 can provide wavelength granularity, SONET/SDH granularity, OTN granularity, Ethernet granularity, layer three granularity (IP), and the like. The switch modules 1406 can include redundancy as well.

Figure 14:
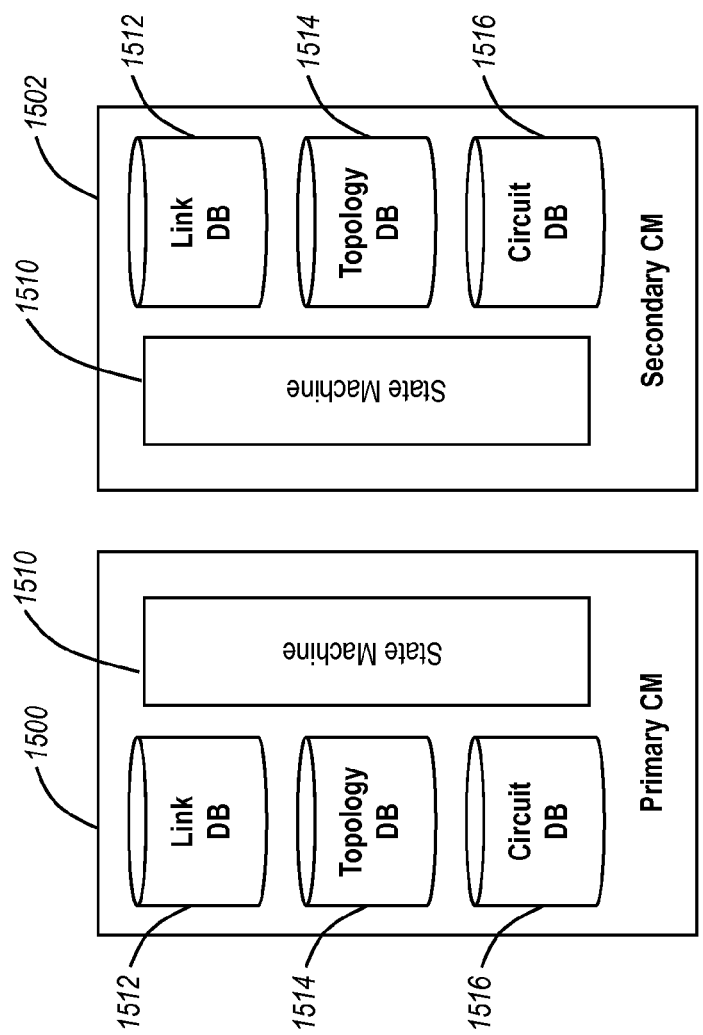
FIG. 14 is a diagram of exemplary redundant controllers configured to implement the systems and methods of the present invention.

Referring to FIG. 14, in an exemplary embodiment, redundant control modules (CMs) 1500, 1502 are illustrated to operate a link state routed network. For example, the CMs 1500, 1502 can be part of common equipment, such as common equipment 1402 in the node 102 of FIG. 13. The CMs 1500, 1502 can include a processor which is hardware device for executing software instructions. The processor can be any custom made or commercially available processor, a central processing unit (CPU), an auxiliary processor among several processors associated with the CMs 1500, 1502, a semiconductor-based microprocessor (in the form of a microchip or chip set), or generally any device for executing software instructions. When the CM 1500, 1502 is in operation, the processor is configured to execute software stored within memory, to communicate data to and from the memory, and to generally control operations of the CM 1500, 1502 pursuant to the software instructions.

The CMs 1500, 1502 can also include network interfaces, a data store, memory, and the like. The network interfaces can be used to enable the CMs 1500, 1502 to communicate on a network, such as to communicate control plane information to other CMs. The network interfaces can include, for example, an Ethernet card (e.g., 10 BaseT, Fast Ethernet, Gigabit Ethernet) or a wireless local area network (WLAN) card (e.g., 802.11a/b/g). The network interfaces can include address, control, and/or data connections to enable appropriate communications on the network. The data store can be used to store data, such as control plane information received from NEs, other CMs, etc. The data store can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store can incorporate electronic, magnetic, optical, and/or other types of storage media. The memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory can have a distributed architecture, where various components are situated remotely from one another, but can be accessed by the processor.

Each of the CMs 1500, 1502 include a state machine 1510, a link database (DB) 1512, a topology DB 1514, and a circuit DB 1516. The CMs 1500, 1502 are responsible for all control plane processing, e.g. OSPF, OSRP, PNNI, etc. For example, the CMs 1500, 1502 can be configured in a redundant 1+1, 1:1, etc. configuration. The state machine 1510 can be configured to implement the constrained flooding algorithms described herein. The DBs 1512, 1514, 1516 can be stored in the memory and/or data store. The link DB 1512 includes updated information related to each link in a network. The topology DB 1514 includes updated information related to the network topology, and the circuit DB 1516 includes a listing of terminating circuits and transiting circuits at an NE where the CMs 1500, 1502 are located. The CMs 1500, 1502 can utilize control plane mechanisms to maintain the DBs 1512, 1514, 1516. For example, a HELLO protocol can be used to discover and verify neighboring ports, nodes, protection bundles, and the like. Also, the DBs can share topology state messages to exchange information to maintain identical data. Collectively, the CMs 1500, 1502 can be configured to implement the methods described herein with respect to creating and maintaining a constrained flooding backbone.

Referring to FIG. 15, in an exemplary embodiment, a link and node status table 1900 is illustrated for an exemplary node 102 in the network 100 of FIG. 3. Each of the nodes 102 in the network 100 include the link and node status table 1900 for storing link and neighbor node status based on messaging in the network 100. For example, the status table 1900 is for the Hemi node 102 in FIG. 3. Those of ordinary skill in the art will recognize the data in the status table 1900 can be stored in any manner at the node 102, and this tabular format is shown for illustration purposes. The status table 1900 includes an entry (row) for each link connected to the node 102, e.g. Hemi has five links. Information is included in the status table 1900 for each link, including the link weight, an ST-bit indicator, a neighbor node status indicator, number of hops to the closest stub node, an indicator as to whether the node is responsible for fixing failures on the link, and a dead end path indicator. The ST-bit indicator is a flag that determines whether or not the link is part of the spanning tree, e.g. F for flooding link—part of the spanning tree, or NF for non-flooding link—not part of the spanning tree.

The neighbor node status can be a three bit indication of the node status. Specifically, this can be set to a dead-end node, a spanning tree node, a multi-link flooding node, a stub node, and an isolated node. After each node processes its node status, it sends a message to each neighbor on flooding links only identifying what it is i.e. a DEN, SN, MLFN or STN type of node. Out of reset, all links can be set to flooding links and neighbor node status is set to MLFN by default. Each node's status is updated after any one of the events including initialization, link failures, and messages received by neighboring nodes occurs and results in a message sent by the node. As messages are received from each neighboring node, the node configures the link and node status table 1900 with information about each of its neighbors. "Hops to closest stub Node" is built as each SNN (Stub Node Notification) message is received on a link. This message has a hop_count to the stub node that originated the SNN message. The node will keep the lowest count received for a link, as there could be multiple stub nodes over that link. SNN messages are eventually discarded by stub nodes that receive the message.

Figure 16:
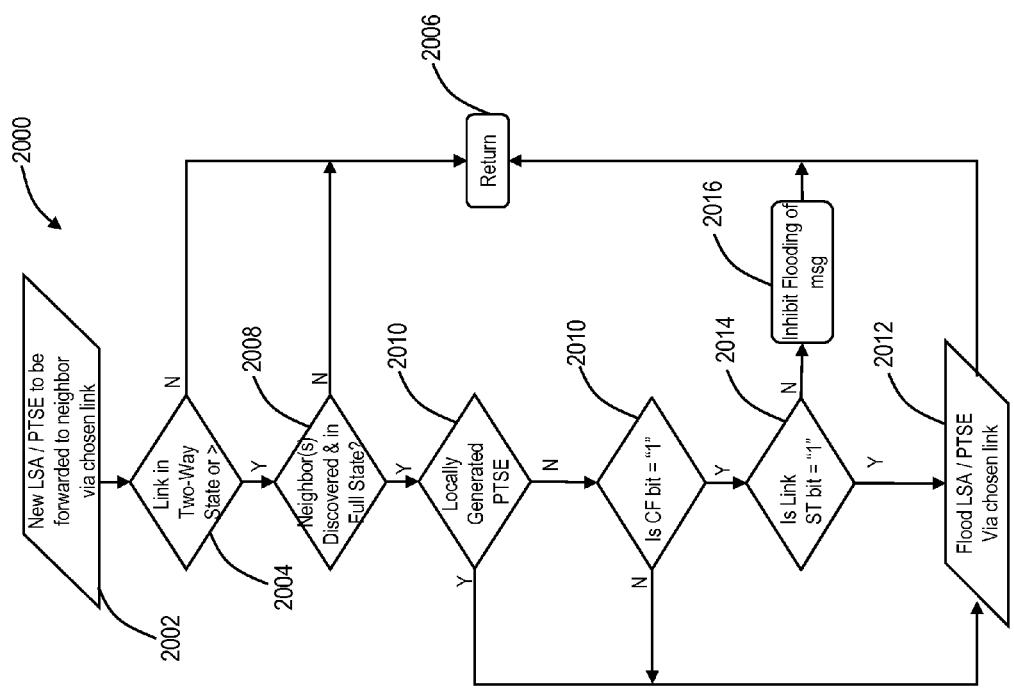
FIG. 16 is a flowchart of a message flooding method executed on each link in a network.

Referring to FIG. 16, in an exemplary embodiment, a message flooding method 2000 is executed on at each node for each link in a network. In addition to the methods described herein used to repair the spanning tree, the method 2000 is executed on each link of a node. For each link on a node, the method 2000 controls whether PTSE messages are flooded or not. There can be an exception in that all locally generated PTSEs are flooded on all links (flooding or not). At step 2002, a new LSA/PTSE is to be forwarded to a neighbor via a chosen link. If the link is not in a two-way state (step 2004), the method 2000 ends (step 2006). If the neighbor(s) are not discover and in a full operational state (step 2008), the method 2000 ends (step 2006). If the message is a locally generated PTSE (step 2010), the method 2000 floods the message via the chosen link (step 2012) and the method 2000 ends (step 2006). If the message is not a locally generated PTSE (step 2010), and a CF bit (i.e., indicator) for constrained flooding is set to "0" for no constrained flooding, then the method 2000 floods the message via the chosen link (step 2012) and the method 2000 ends (step 2006). The CF—Constrained Flooding bit is a binary (0/1) bit when set to a "1" a spanning tree backbone is used to constrain flooding of PTSE messages and this spanning repair algorithm is executed to repair the spanning tree upon link failure(s). When set to "0", all links on the node are flooding links, no spanning tree backbone is used for flooding and this algorithm is never executed to repair the spanning tree backbone in the event of failures. Default is "0," i.e. no constrained flooding. If constrained flooding is active, i.e. "1", the method 2000 checks if the link ST bit (i.e., indicator) is set to "1" (step 2014), and if not, the method 2000 inhibits flooding of the message on this link (step 2016) and the method 2000 ends (step 2006). If the ST bit is set to "1", the method 2000 floods the message via the chosen link (step 2012) and the method 2000 ends (step 2006).

Referring to FIGS. 17-23, in an exemplary embodiment, flowcharts illustrate a spanning tree repair method 2100 of the present invention. The repair method 2100 can be implemented on the nodes 102 in the network 100, and can utilize the messages and node status descriptions presented herein. The repair method 2100 includes the following abbreviations:

| | |
|---|---|
| ST | Spanning Tree |
| DEN | Dead-End Node |
| STN | Spanning Tree Node |
| MLFN | Multi-Link Flooding Node |
| SN | Stub Node |
| IN | Isolated Node |
| SNN | Stub Node Notification message |
| STNN | Spanning Tree Notification |
| DENN | Dead End Node Notification message |
| MLFNN | Multi-link flooding node notification message |
| STN | Spanning tree node notification message |
| FL | a count of the number of ST-Links i.e. flooding links |
| NFL | a count of the number of functional links that are not used for flooding |

Figure 17:
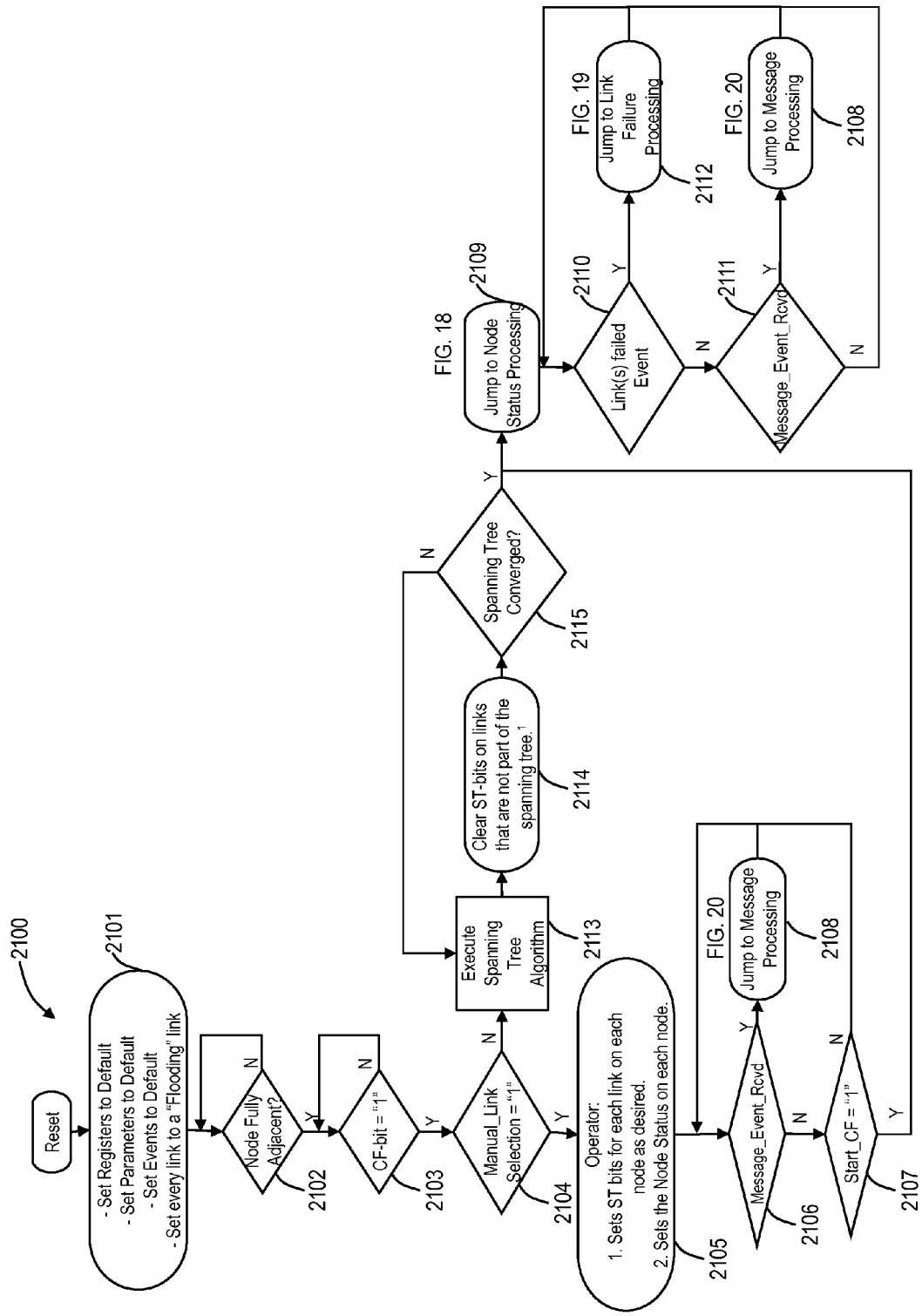
FIGS. 17-23 are flowcharts of an exemplary spanning tree repair method of the present invention.

FIG. 17 is a flow chart for the main routine used for the spanning tree repair method 2100. Steps 2101-2103 include initialization steps with step 2101 setting all parameters to default values and designating all links in the network as flooding links. In steps 2102-2103, the method 2100 will not operate if nodes are not fully adjacent and if a CF (Constrained flooding) flag is not true. Here, the method 2100 does not operate if there are breaks in the network and if the network is not set to use a spanning tree backbone for constrained message flooding. At step 2104, the method 2100 determines how the spanning tree backbone is created, e.g. through a manual link selection flag which is true where the spanning tree is manually defined or false for automatic creation. Links selected for flooding are done either manually by the operator or by executing the Spanning tree algorithm. Note, when the operator chooses the manual selection method, he can also run Prim's algorithm offline and then manually select the links accordingly.

The operation of the main routine utilizes three global bits to control the operation. A CF-bit: The default (CF-bit="0") is for no constrained flooding on any links, i.e. all links will flood PTSE messages. The constrained flooding algorithm (e.g., the message flooding method 2000 of FIG. 16) is not executed unless this bit is set to a "1", all other bit settings associated with constrained flooding are ignored if CF-bit='0'. A Manual_link_selection (step 2104): The default is for manual selection of flooding links i.e. done by the operator (Manual_Link_Selection="1"). A Start_CF (step 2107): Default is "0", this bit has significance if manual selection is used to select flooding links. Only after this bit is set to a "1" will the constrained flooding algorithm (e.g., the message flooding method 2000 of FIG. 16) be executed when manually selecting flooding links. If the operator wanted to employ manual setting of the flooding links he performs the following sequence of operations: 1) Manual_LinK_Selection is set to manual selection by default, but to be sure, the operator sets it to a "1"; 2) The operator then clears the ST-bits on links that are not needed for flooding i.e. he sets them to "0" on a node (step 2105). By default, the ST-bit are set to flooding. He also programs what the Node_Status_Register for each node. Note, Start_CF is still set to "0", so message received can be processed by nodes in this state, but they don't initiate sending any messages and don't fix link failures (steps 2106, 2108). 3) Once finished with step 2, the Start_CF bit is set to a "1" on Stub nodes first (step 2107). This results in SNN messages traversing the entire tree with each node learning the hop_count to that node (step 2109). 4) Step 3 is repeated for all MLFN, STN and DEN nodes (step 2107). 5) After step 4 is completed, each node awaits either a link failure or message to be received (steps 2110, 2111). If neither occurs, nothing happens. So, the repair method 2100 appears dormant. If a link failure is detected (step 2110), the repair method 2100 executes link failure processing (step 2112, illustrated in FIG. 19). If a message is received (step 2111), the repair method 2100 executes message processing (step 2108, illustrated in FIG. 20). To use Spanning tree algorithm for selecting links, the operator follows this sequence of operations: Sets CF-bit to a "1" (step 2103); Sets Manual_Link_Selection set to "0" (step 2104); and the repair method 2100 executes a spanning tree algorithm to define the spanning tree (step 2113). As the spanning tree is defined, spanning tree (ST) bits are cleared (set to "0") on links that are not part of the spanning tree (step 2114), and once the spanning tree converges (step 2113), the repair method 2100 awaits link failure(s) or messages to be received.

Figure 18:
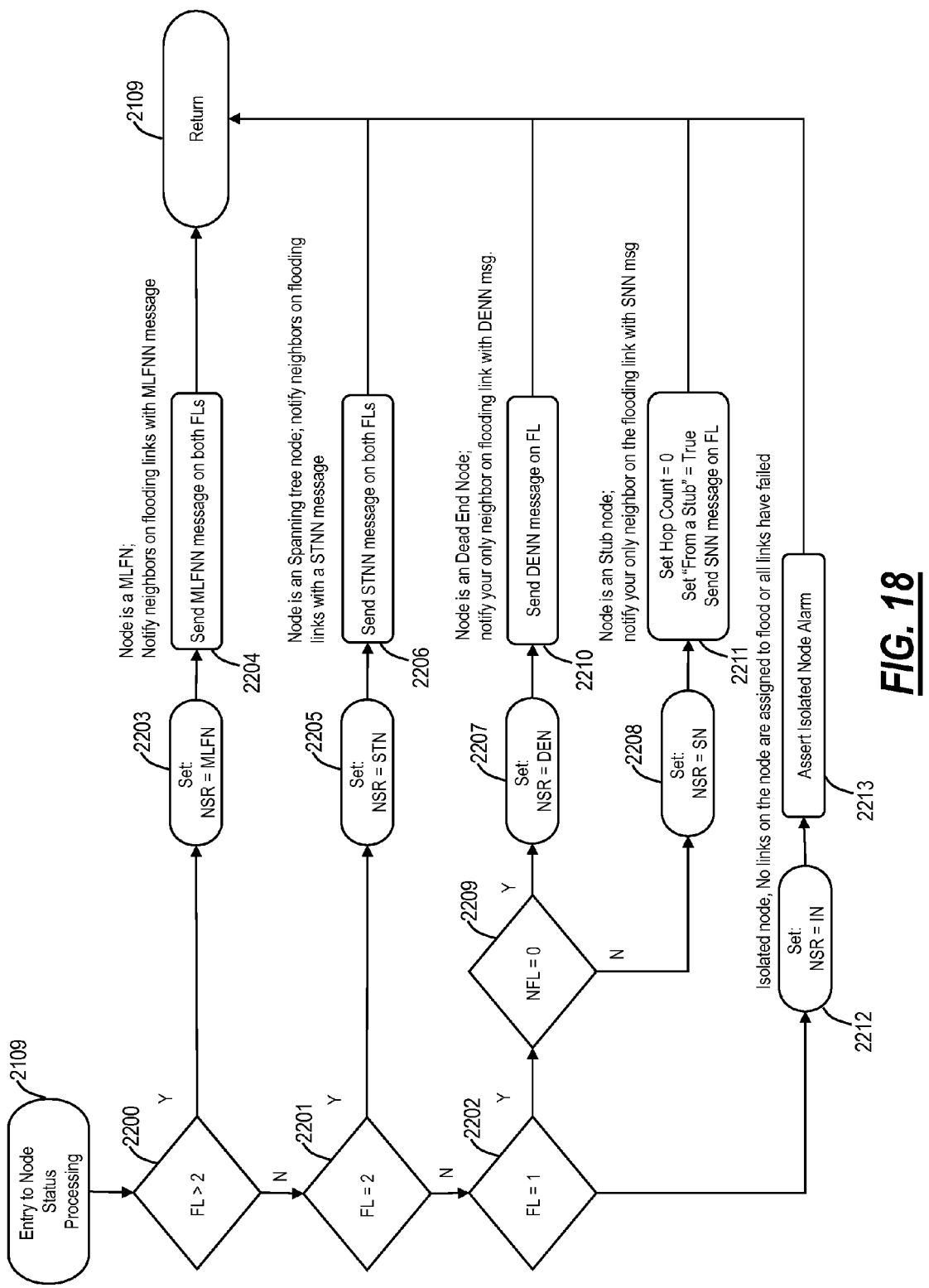

FIG. 18 is a flowchart of node status processing from step 2109 in the main routine of FIG. 17. Node status processing is performed at each node to determine a node status (i.e., MLFN, STN, DEN, SN, IN). FL is a parameter that is an integer indicating the number of flooding links on a node i.e. the number of links with the ST-bit set to a "1". NFL is a parameter that is an integer indicating the number of non-flooding links on a node i.e. the number of links with the ST-bit set to a "0". The node status processing tests the FL value (steps 2200, 2201, 2202). Any value greater than 2 indicates a MLFN node (step 2203), and results in an MLFNN message on all flooding links (step 2204); a value equal to 2 indicates a STN node (step 2205), and results in an STNN message sent on both flooding links (step 2206); and a value of 1 indicates the node is either a DEN (step 2207) or a Stub node (step 2208) based on whether or not there are non-flooding links at the node (step 2209). i.e. a node with no other links as non-flooding links (NFLs) is a DEN and results in a DENN message (step 2210), otherwise it is a stub node. If it is a stub node then, Hop_Count is set to "0", "From a stub" is set to true and the message is sent on the flooding link(s) (step 2211). From a stub" is a Boolean used by a node receiving a SNN message. It indicates that the SNN message just came from a stub node. A node receiving a SNN with "From a stub" set to true will update his neighbor status with "stub node" for that link and then forward the SNN out all other links after the Hop_Count is incremented. If False, the node simply increments the Hop_Count and forwards the SNN message out of all other flooding links. Finally, if there are no flooding links to a node, then the node is an isolated node (IN) (step 2212) and an isolated node alarm is asserted (step 2213).

Figure 19:
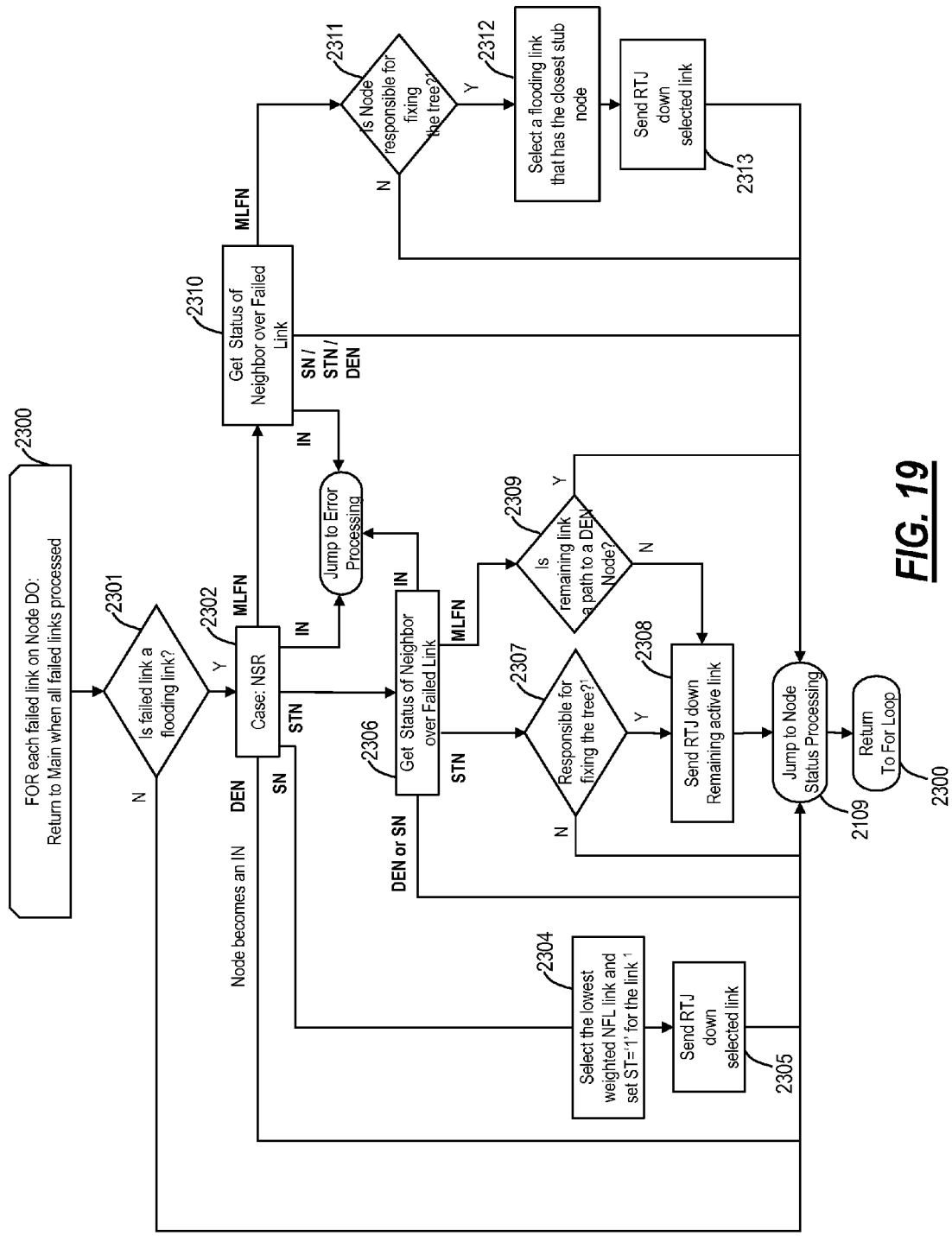

FIG. 19 is a flowchart of link failure processing from step 2112 in the main routine of FIG. 17. There can be multiple link failures and the node will process each failure one at a time (step 2300). If the failure is on a NFL link (step 2301), then the nodes status is simply updated (step 2109). Otherwise, the NSR (node's status register) is tested with the Case statement (step 2302). If the node is a stub node, then it selects the lowest weighted NFL link, sets the ST-bit to a "1" (step 2304) and sends an RTJ down the link (step 2305). If the node is a STN, the neighbor's status is examined (step 2306). If the neighbor is a STN, then it was determined at start up when both ends sent each other a STN_ARB message as to which node fixes the failure (step 2307). If the node is responsible, it sends an RTJ down the remaining active link (step 2308), which will ultimately find its way to a stub node. If the node is a STN and the neighbor is an MLFN (step 2309), then if the nodes on the other end of the failed link lead to a dead end path, nothing is done. Otherwise, an RTJ is sent down the remaining active link (step 2309). If the node is a MLFN (step 2310), then the node will only fix the link failure if the node on the other end of the link is a MLFN and it was determined at start up via MLFN_ARB messages that the node is responsible for fixing the link failure (step 2311). The node fixes the failure by selecting the remaining flooding link closest to a stub node (step 2312) and issuing a RTJ message (step 2313). For all other nodes (SN, DEN, STN) the node does nothing. SN and STN nodes will fix the failure and DENs will become isolated nodes.

Figure 20:
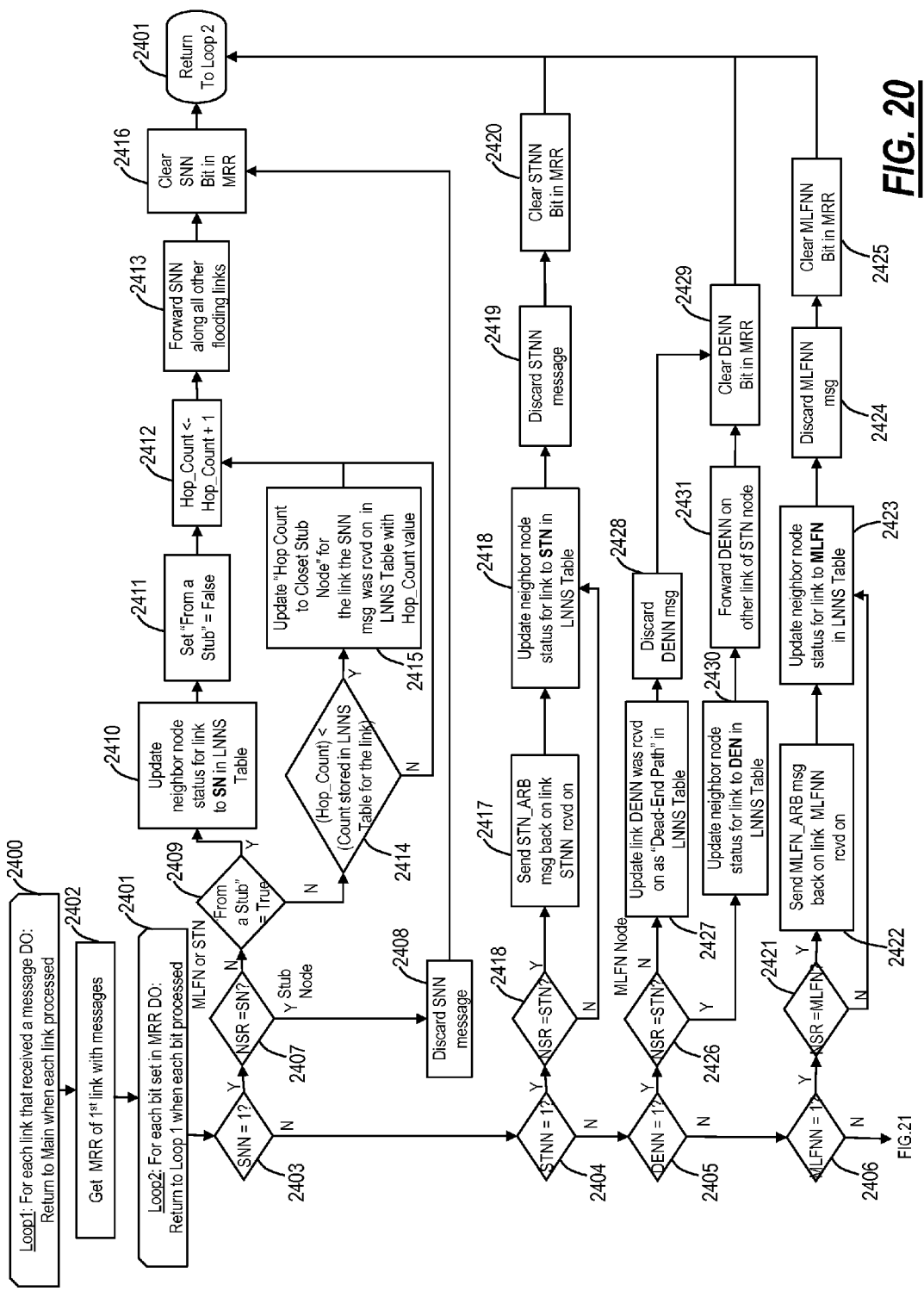
Figure 21:
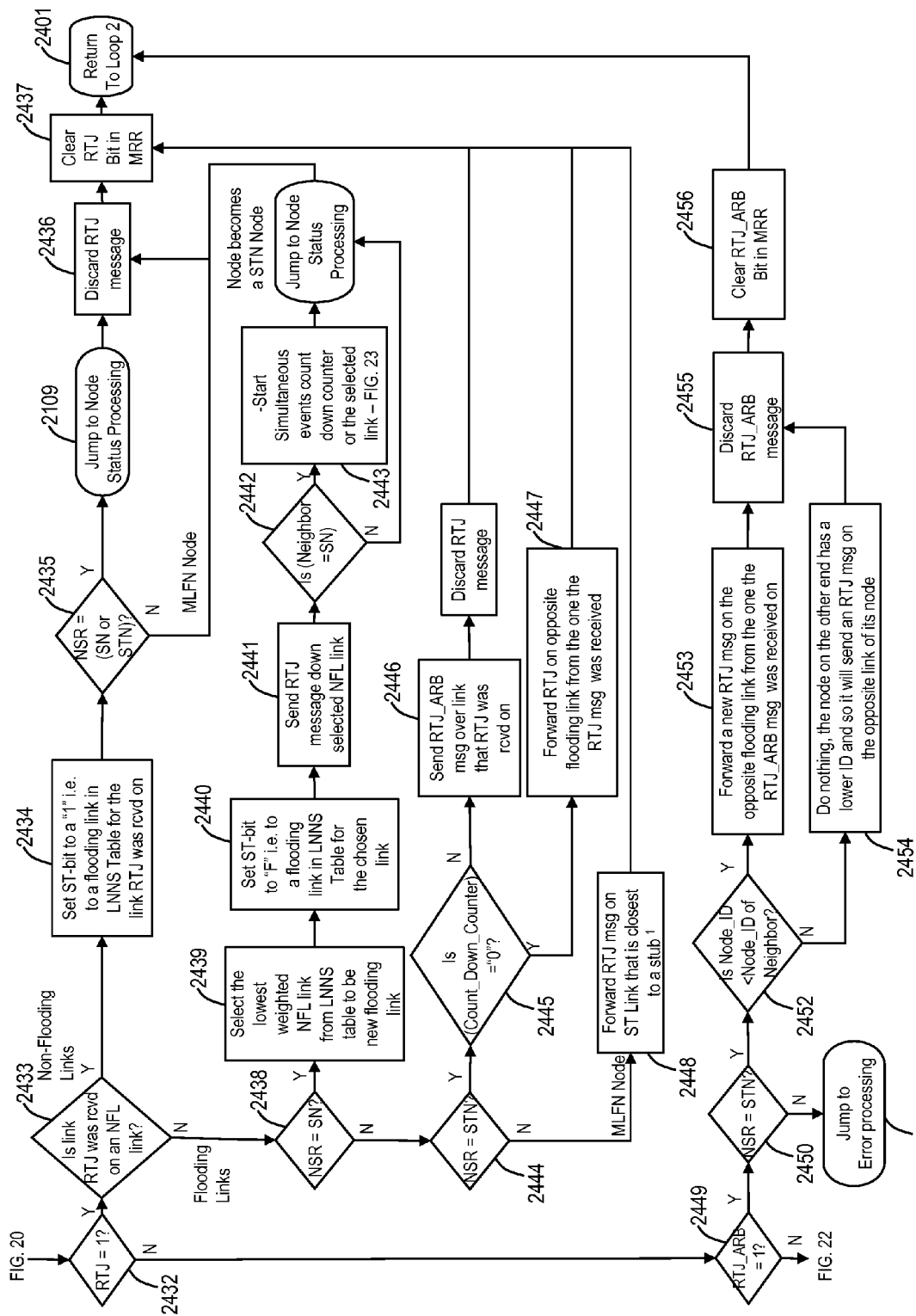
Figure 22:
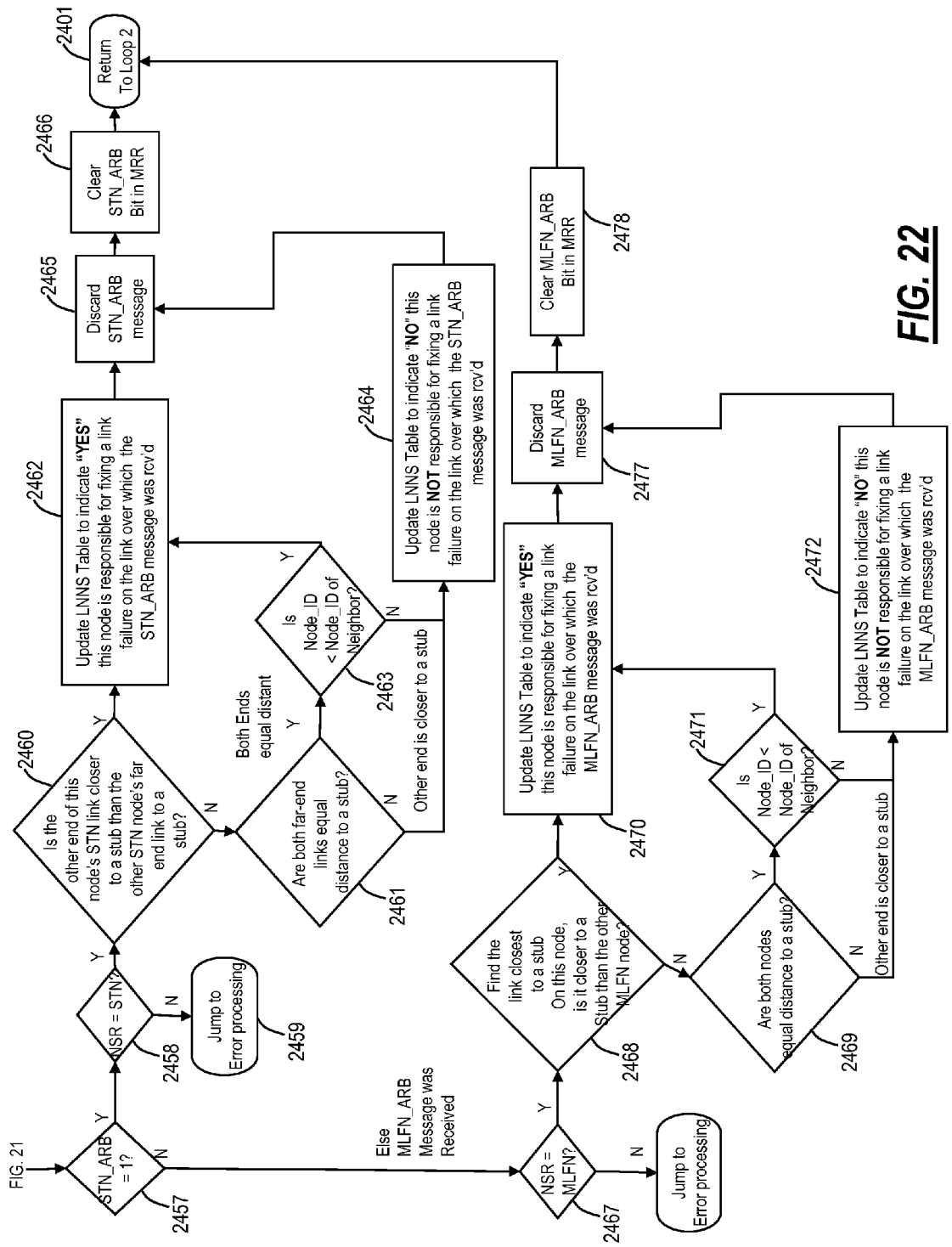

FIGS. 20, 21, and 22 are flowcharts of a message processing routine from step 2108 the main routine of FIG. 17. The message processing routine is illustrated as two loops—loop1 (step 2400) and loop2 (step 2401). A Message_RCVD_Register (MRR) is a register associated with every flooding link in the network indicating a specific type of message received on the link. As described here in FIGS. 20, 21, and 22, the MRR is a five-bit register with a Boolean true/false flag for RTJ, STNN, SNN, MLFN, and DENN messages. The routine begins getting the MRR of the first link with messages (step 2402). There is an implied priority in processing of messages received. It is key to have the status of each node established, so the node status messages i.e. SNN, STNN, DENN and MLFN are processed first (in steps 2403, 2404, 2405, and 2406). Also, SNN is the highest priority message, since all nodes must know where the stub nodes are and how far away they are for the protocol to work.

If an SNN is received (step 2403), then if the node is a stub (step 2407), it will discard the message (step 2408). Otherwise, if the "From a stub" flag is true in the SNN message (step 2409), then the neighbor node status is updated to SN in the LNNS Table (step 2410). The "From a stub" flag is then set to false (step 2411) followed by incrementing the Hop_Count (step 2412) before the SNN is forwarded along all flooding links (step 2413). If the flag "From a stub" is false then the neighbor that sent the SNN is not a stub, so the Hop_Count in the stub message is tested to see if it's less than the count stored in the LNNS table for the link (step 2414). If it is, the LNNS table is updated with the Hop_Count in the SNN message (step 2415). In either case, the Hop_Count is incremented (step 2412) and then forwarded along all flooding links (step 2413). The SNN bit is cleared in the MRR (step 2416), and the routine returns to loop2 (step 2401).

An notification of a spanning tree neighbor via an STNN (step 2404) results in an STN_ARB sent by to the node that sent the message (step 2417) only if the node is a stub node (step 2418). The nodes will arbitrate to determine which node is closer to a stub and therefore responsible for fixing the tree in the event of the link failing. The neighbor node status for the link to the stub node is updated in the link and neighbor node status table (LNNS) (step 2418), the STNN message is discarded (step 2419), the STNN message is discarded (step 2420), and the routine returns to loop2 (step 2401). The same process with respect to an MLFNN message occurs as with the STNN, only this time an MLFN_ARB message is sent back over the link (steps 2421-2425).

DENN messages are forwarded by STN nodes (step 2405), this is to let MLFN that on may be on this link that there is no stub. Depending on whether the node is a stub node or not (step 2426). If the node is not a stub, then the DENN was received on a dead-end path—this is updated in the LNNS (step 2427), the DENN message is discarded (step 2428), the DENN bit in the MRR is cleared (step 2429), and the routine returns to loop2 (step 2401). If the node is a stub, the neighbor node status is updated to DEN in the LNNS (step 2430), the DENN is forwarded on other links of the stub node (step 2431), the DENN bit in the MRR is cleared (step 2429), and the routine returns to loop2 (step 2401).

In FIG. 21, if a RTJ message was received (step 2432), then if it came over an NFL link (step 2433), then the link is made a flooding link by setting the ST-bit to a "1" (step 2434). If the node status is either SN or STN (step 2435), then the routine jumps to node status processing (step 2109), discards the RTJ message (step 2436), clears the RTJ bit in the MRR (step 2437), and the routine returns to loop2 (step 2401). If the RTJ was received over a flooding link (step 2433), then if the node is a stub (step 2438), the stub selects the lowest weighted NFL link to make a flooding link (steps 2439-2441). If the immediate neighbor is a stub node (step 2442), the simultaneous events counter is started (step 2443, illustrated in FIG. 23). So, if an RTJ is received by the other node (step 2444), then with a non-zero count value (step 2445), it is known that another link failure occurred in the network and the two nodes need to arbitrate (step 2446), which is done via the RTJ_ARB message. Otherwise, the RTJ is forwarded on the opposite flooding link from the one the RTJ message was received (step 2447). If the RTJ message was received by an MLFN node, it will be forwarded on an ST-Link that is closest to a stub (step 2448).

If a RTJ_ARB message was received (step 2449), and the node is not a stub node (step 2450), the routine jumps to error processing (step 2451). If the node is a stub, arbitration is performed by checking the Node_ID versus the neighbor's Node_ID (step 2452). In an exemplary embodiment, the lower Node_ID can win the arbitration. If the node wins, the node forwards a new RTJ message on the opposite flooding link from the one the RTJ_ARB was received on (step 2453). If the node loses, it does nothing, the node on the other end has a lower Node_ID and so it will send an RTJ message on the opposite link of its node (step 2454). After steps 2453 and 2454, the RTJ_ARB message is discarded (step 2455) the RTJ_ARB bit is cleared in the MRR (step 2456), and the routine returns to loop2 (step 2401).

In FIG. 22, the STN_ARB message should only be received between STN nodes (steps 2457, 2458), otherwise there is an error (step 2459). The nodes will compare the distance to a stub on their far end links (steps 2460, 2461), the node closer is then responsible for fixing the link over which the STN_ARB was received (step 2462). If the nodes are equal distant, the Node_ID can be used to arbitrate (step 2463). If the node is not responsible for fixing the link, the LNNS table is updated accordingly (step 2464). The STN_ARB message is discarded (step 2465), the STN_ARB bit is cleared in the MRR (step 2466), and the routine returns to loop2 (step 2401). The final message received in an MLFN_ARB message (step 2467), and the steps for processing are similar as the processing steps for the STN_ARB message (steps 2468-2478).

Figure 23:
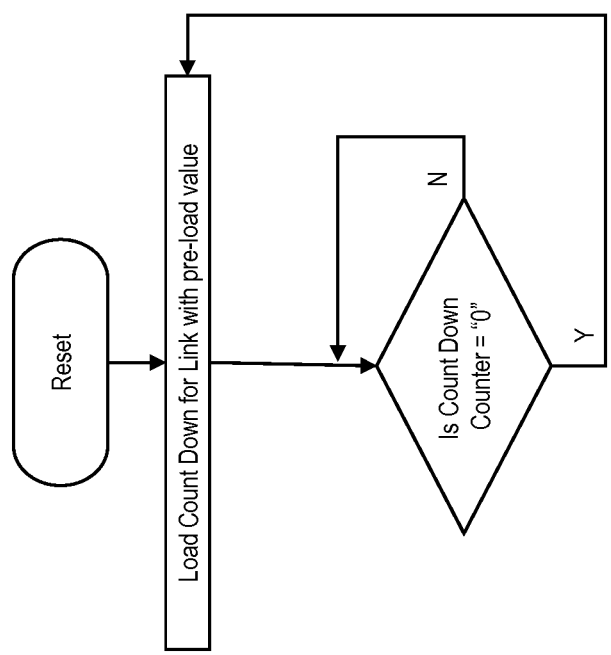

FIG. 23 is a flowchart of a simultaneous count down process used by FIGS. 20, 21, and 22. There is a Simultaneous events count down counter per link. Each counter is loaded with the programmable value after reset, which counts down to zero. The counter is enabled in the message processing routine if an RTJ was sent down a non-flooding ST link between stub nodes. Once a counter completely counts down to "0" it is reloaded with the pre-load value. If an RTJ message is received on a link and the counter is not equal to zero, then a RTJ_ARB message is sent to the node across the link This is done since a simultaneous RTJ was detected across a link between two stub nodes. After the RTJ_ARB message, one of the nodes will send an additional RTJ messages to repair an additional link failure that occurred.

Figure 24:
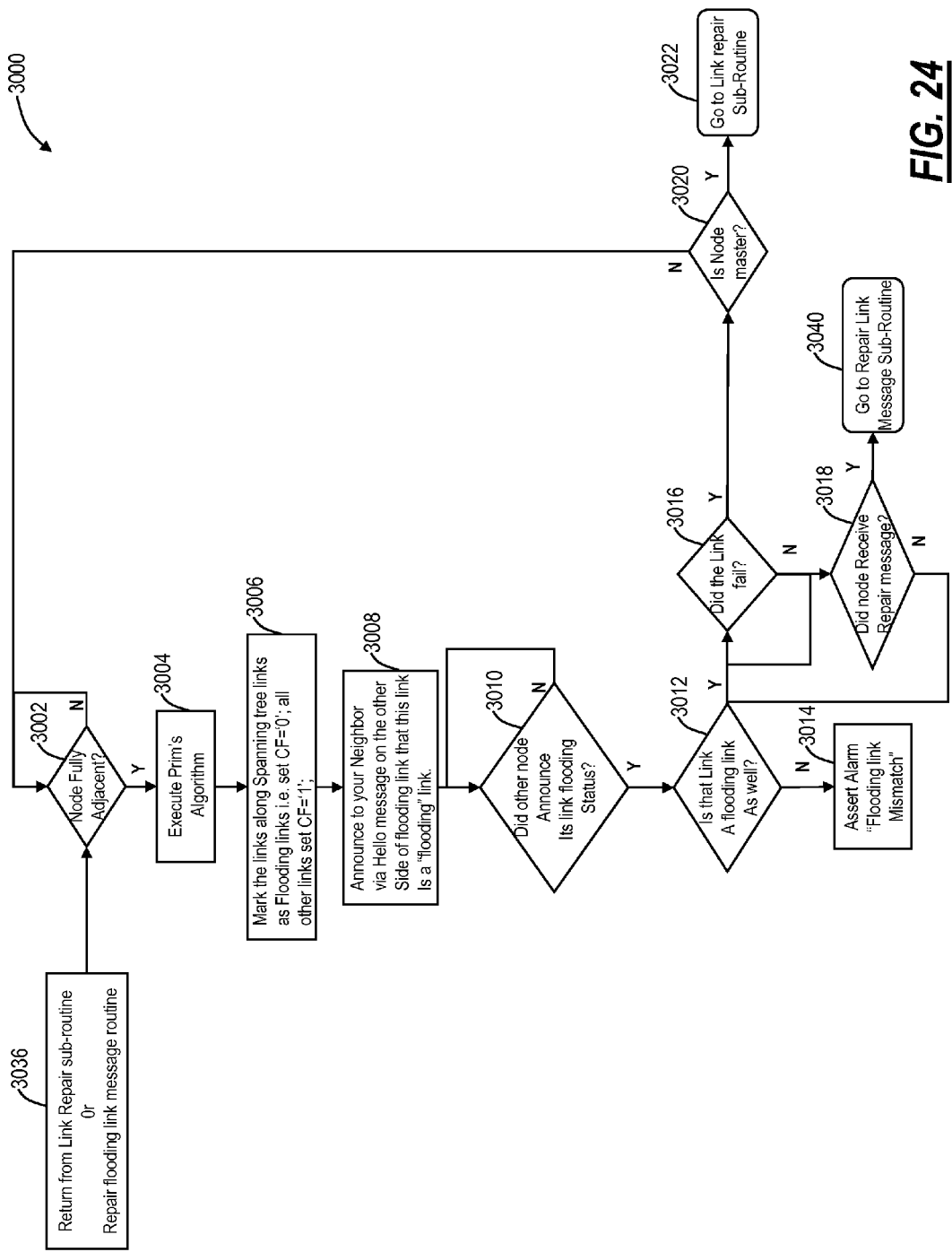
FIG. 24 is a flowchart of a spanning tree method for automatically creating and maintaining a spanning tree flooding backbone in a link state routed network.
Figure 25:
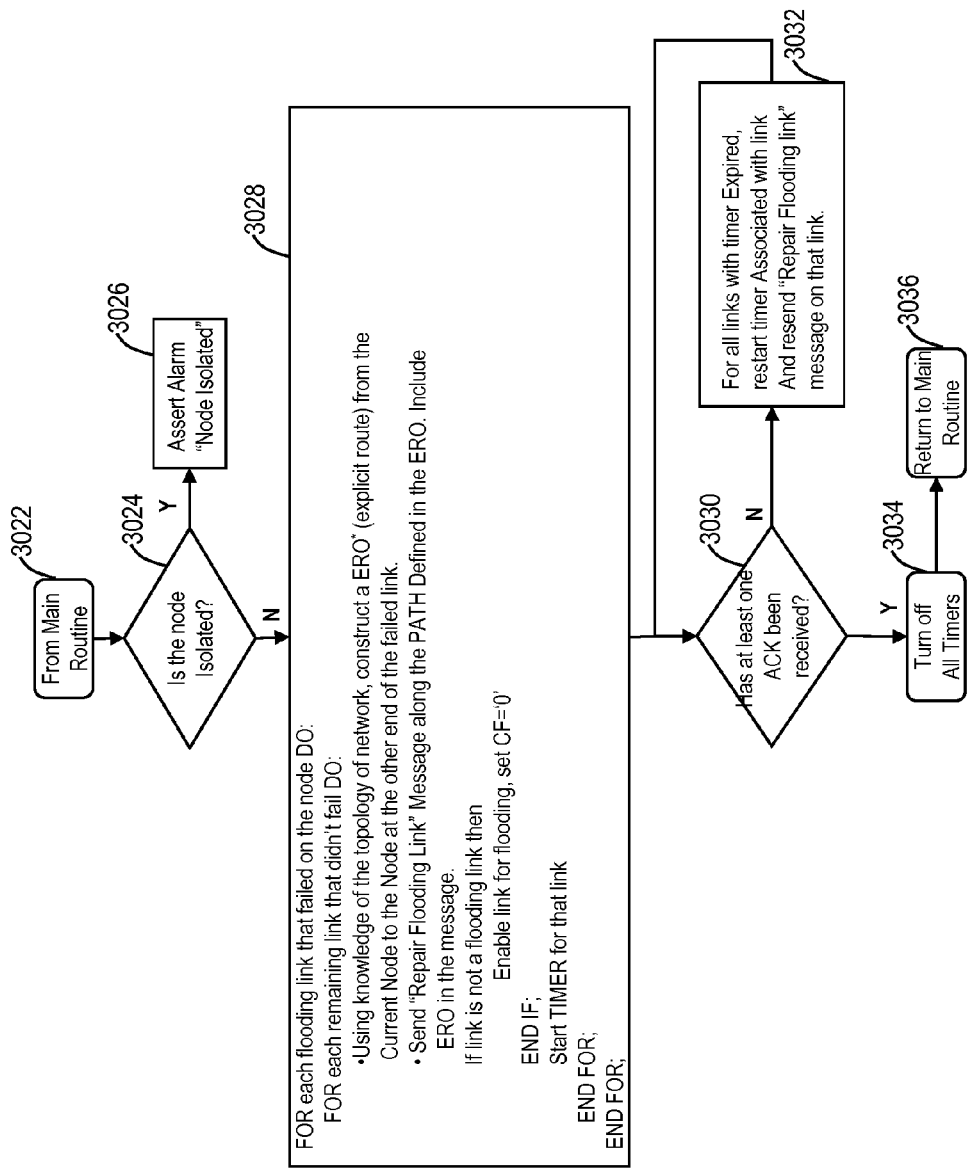
FIG. 25 is a flowchart of a link repair sub-routine in the spanning tree method of FIG. 24 for automatically repairing by a master node one or more failed links in the spanning tree flooding backbone.
Figure 26:
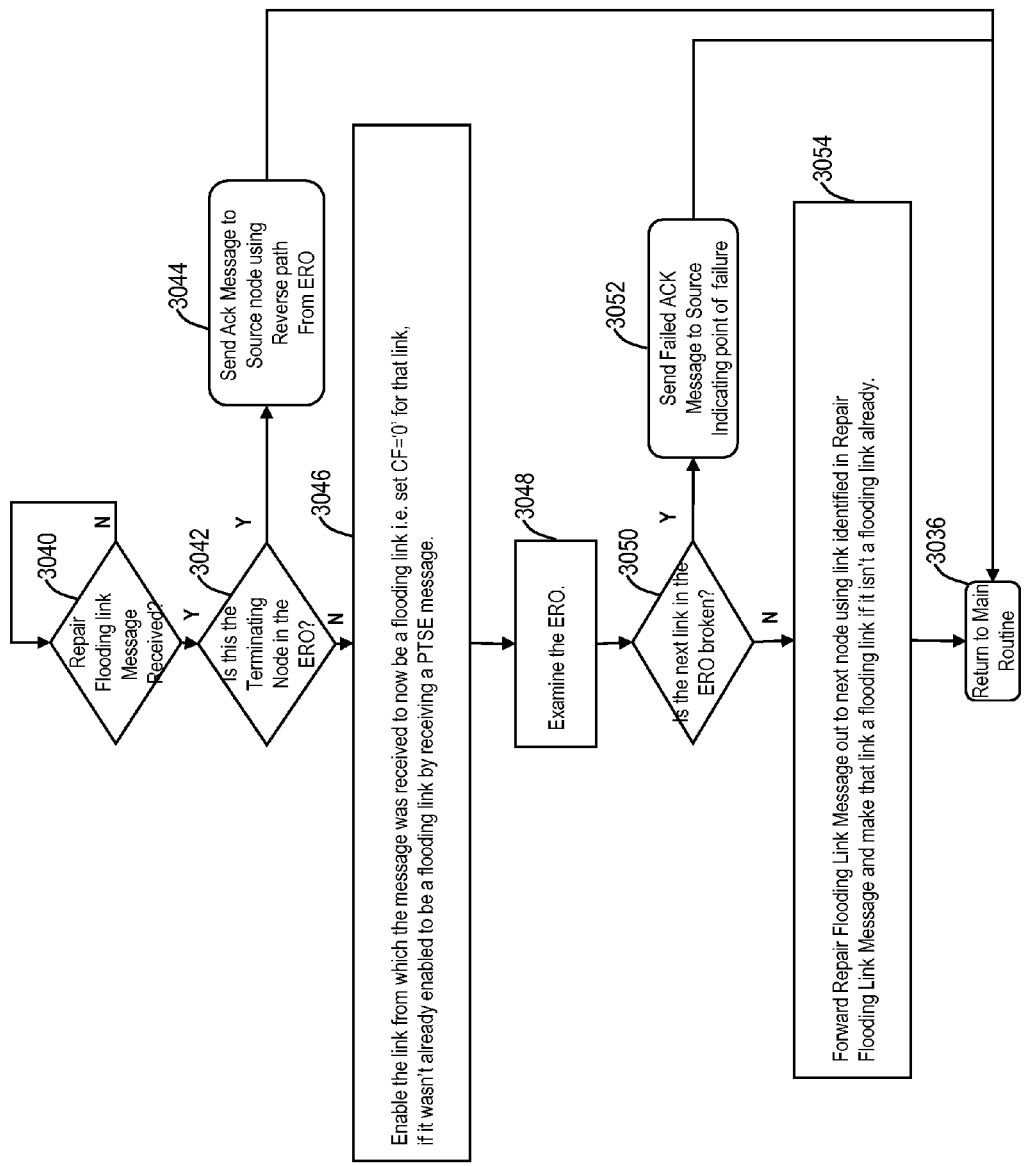
FIG. 26 is a flowchart of a repair link message sub-routine in the spanning tree method of FIG. 24 showing how each node processes link repair messages.

Referring to FIGS. 24-26, in another exemplary embodiment, flowcharts illustrate a spanning tree method 3000 where all nodes in a network independently construct a spanning tree flooding topology on links between the nodes. The spanning tree method 3000 takes utilizes the fact that each node has knowledge of the topology obtained through routing. Advantageously, the spanning tree method 3000 may be implemented automatically without any intervention from a user, i.e. the spanning tree flooding topology may be automatically and independently calculated by all nodes with a self-check between the nodes ensuring a correct calculation has been made. Furthermore, upon any failure or breaks on the links, the spanning tree method 3000 may be used to repair the spanning tree flooding topology whereby a master node on a failed link automatically. For example, the spanning tree method 3000 may include a new message "Repair the Flooding link" to repair the tree through attempts to re-establish a connection to the node across the failed link. If successful, or once the network converges and the topology after the failure is known by all nodes, all the nodes again independently construct a new spanning tree flooding topology without user intervention. The spanning tree method 3000 may be implemented in any link state routed network, such as the network 100 with the plurality of nodes 102.

Referring to FIG. 24, in an exemplary embodiment, a flowchart illustrates the spanning tree method 3000 for automatically creating and maintaining a spanning tree flooding backbone in a link state routed network. As described herein, the network and the nodes are configured to constrain various messages such as topology advertisements to only links in the spanning tree flooding backbone. Further, as described herein, the spanning tree flooding backbone is a spanning tree through the network that includes links such that all nodes in the network are fully interconnected. The spanning tree method 3000 takes advantages of routing in the network such that each node has a full view of the topology of the network. As such, each node may independently calculate the spanning tree flooding backbone with each node coming up with the same links forming the spanning tree flooding backbone. The spanning tree method 3000 verifies that each node has the same links on the spanning tree flooding backbone, and then utilizes only such links for advertisements.

The full view of the network is obtained once each node achieves "full adjacency" with all of its neighbors (step 3002). That is, the spanning tree method 3000 starts upon obtainment of full adjacency for each node. Subsequently, each node in the network independently executes Prim's algorithm (step 3004), such as the Prim's algorithm 200 illustrated in FIG. 2. Since each node has the same overall view of the network, the outcome of Prim's algorithm should be the same spanning tree flooding backbone for each node. The spanning tree method 3000 marks each link along the spanning tree flooding backbone as flooding links, i.e. setting a constrained flooding (CF) flag for each link as '0' for flooding links and '1' for all other non-flooding links (step 3006). Each node then announces to its neighbors via HELLO messages on the other side of each flooding link that the link is a flooding link (step 3008).

The spanning tree method 3000 checks and waits to see that each opposing node also announces its link flooding status (step 3010). All nodes cross check with one another that a correct calculation was done by sending an indication over the HELLO message on the link the node believes to be a flooding link to the other node across the link. The other node should agree and also sends such an indication on its Hello message sent back to the other node. Once all nodes have announced to their neighbors that all links are flooding links, the spanning tree method 3000 checks to ensure that all flooding links were properly acknowledged between the nodes (step 3012). If there is a mismatch on any of the links, the spanning tree method 3000 asserts an alarm such as "flooding link mismatch" (step 3014). If all the links match, then the spanning tree method 3000 now allows the spanning tree flooding backbone to operate on the flooding links while waiting if there is a possible failure on any of the flooding links (step 3016). A failure or cut of any link in the network normally results in link state updates or PTSEs messages in OSRP "flooded" on all links of the node; this is flooded again on all other nodes that receive these messages, which is known to overburden each node and the entire network with needless processing of duplicate messages. To make it more efficient, LSAs or PTSEs are only flooded on the flooding links obtained by running Prim's algorithm.

At step 3016, each node awaits a possible link failure or receipt of a repair message (step 3018). At step 3016, if there is a failure on a flooding link, the spanning tree method 3000 checks at each node associated with this failed link whether it is a master node (step 3020). Both ends of the failed link do not attempt to repair the failed link, only the node that is the Master node between them initiates and performs this repair process. The Master/Slave relationship between two nodes sharing a link is established in the adjacency process. Also, all links that are still active, i.e. not failed, have a "Repair Flooding Link" message sent across them. The master node is configured to execute a link repair sub-routine (step 3022). Having only the master node repair ensures that at least one of the repair messages succeeds in repairing the flooding topology, since the node has no knowledge of all the failures that may have occurred in the network. The priority is simply to repair the tree so that LSA and PTSEs are received by all nodes in the network. Note, where no failures have occurred in the network, the flooding topology remains as a spanning tree from the previous calculation. Following a failure and once the network achieves full adjacency, Prim's algorithm from is executed once again to rebuild the spanning tree flooding topology as an efficient topology.

Referring to FIG. 25, in an exemplary embodiment, a flowchart illustrates the link repair sub-routine in the spanning tree method 3000 for automatically repairing by a master node one or more failed links in the spanning tree flooding backbone. First, the link repair sub-routine checks if the node is isolated (step 3024), i.e. has no active links to the network. If the node is isolated, the link repair sub-routine asserts an alarm such as "node isolated" (step 3026). If the node is not isolated, the node attempts to repair/rebuild the spanning tree flooding backbone (step 3028). Specifically, the node runs a nested loop that for each failed flooding link on the node constructs an Explicit Route Object (ERO) for each operating link on the node. Here, the node is using route discovery protocols that already operate on the node to find a route to the opposite node on the failed link. This new route will connect the node to the opposite node without the failed link. For each ERO successfully constructed, the node sends a "repair flooding link" message along the path defined in the ERO. This message ensures that each link along the path is enable as a flooding link, i.e. setting the CF flag to '0'. The node sets a timer during this nested loop for a predetermined time period. In an exemplary embodiment, the EROs can be built off-line and stored in a table for quick access during this process.

Upon expiry of the timer, the node checks to see if at least one acknowledgement (ACK) has been received (step 3030). If not, for all links where the timer expired, the timer associated with that link is restarted and "Repair Flooding link" message is resent on that link (step 3032). There may be failed ACK messages returned by nodes that may have the links broken on them preventing them from forwarded the Repair message, this is sent back to the originating node, so it knows there is failure in attempting to repair the tree along that path. Also, the timers may expire and the node will restart the timer a programmed number of times, once the timers expire for all paths this programmed number of times, the node gives up and assert an alarm indicating it can not repair the tree. If at least one ACK has been received, the node turns off all of the times (step 3034) and returns to the spanning tree method 3000 (step 3036). Effectively, the link repair sub-routine has repaired the failed link or links by constructing the ERO across to the opposite node and by enabling flooding on the links in the ERO. Now the network once again has full adjacency with the failed link or links. Once adjacency is achieved again, Prim's algorithm is executed once again and the spanning tree flooding topology is rebuilt (step 3002).

Of note, the link repair sub-routine does not repair the tree as spanning tree, rather the link repair sub-routine simply repairs the tree. In this case, knowledge of the topology via routing is used once again, this time to construct an ERO (explicit route) to the node across the failed link. This ERO is part of a "Repair Flooding Link" message which the node sends to each node and across each link identified in the ERO after a timer is started for that link. If the link over which the message is sent is not a flooding link, it is now made a flooding link by both nodes sharing that link Once received by the last node in the ERO, the message is discarded and an ACK is sent back to the originating node by using the ERO received in the "Repair Flooding Link Message. The originating node will reissue the "Repair Flooding Link" message on each link that did not receive an ACK message before the timer associated with that link expired. So, the node makes a valiant attempt to repair the tree around where the failure occurred and if unsuccessful it notifies the user that it tried was unable to succeed. Note, with knowledge that the attempted paths failed, the node could generate new paths that exclude these failed paths that it now knows about.

Referring back to FIG. 24, at step 3018, a node may receive a repair message and the node executes a repair link message sub-routine (step 3040). Referring to FIG. 26, in an exemplary embodiment, a flowchart illustrates a repair link message sub-routine in the spanning tree method 3000 showing how each node processes link repair messages. As described in the spanning tree method 3000, the repair link message sub-routine executes on a node receiving a repair flooding link message (step 3040). The repair link message sub-routine checks if the node is a terminating node in the ERO (step 3042), and if so, sends an ACK message back to the source node of the repair message using the reverse path from the ERO (step 3044). The repair link message sub-routine returns to the spanning tree method 3000 (step 3036).

If the node is not the terminating node in the ERO (step 3042), the node enables the link from which the message was received to now be a flooding link, i.e. set CF='0' for that link if it was not already enabled to be a flooding link by receiving a PTSE message (step 3046). The repair link message sub-routine examiners the ERO (step 3048). The repair link message sub-routine checks if the next link in the ERO is broken or not (step 3050), and if so, sends a failed ACK message to the source node indicating the point of failure (step 3052). The repair link message sub-routine returns to the spanning tree method 3000 (step 3036). If the next link in the ERO is not broken (step 3050), then the node forwards the repair flooding link message out to next node using link identified in repair flooding link message and makes that link a flooding link if it is not a flooding link already. The repair link message sub-routine returns to the spanning tree method 3000 (step 3036).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network operating method, comprising:
upon achieving full adjacency of nodes in a network, determining a single spanning tree connecting each node via an algorithm;
setting each link in the spanning tree at each of the nodes as a flooding link;
checking at each of the nodes with neighboring nodes a link flooding status of links associated with the spanning tree; and
operating the network using only the links in the spanning tree to exchange link state messages while using all links to exchange data thereon, wherein the network comprises at least one link not part of the spanning tree on which the link state messages are not flooded, and wherein the link state messages comprise topology information.

2. The network operating method of claim 1, further comprising:
exchanging messages between each of the nodes such that each of the nodes comprises a topology of the network.

3. The network operating method of claim 1, further comprising:
for mismatched links in the checking step, asserting a flooding link mismatch alarm.

4. The network operating method of claim 1, wherein the algorithm comprises Prim's algorithm.

5. The network operating method of claim 1, wherein during the achieving full adjacency, opposing nodes on a particular link are designated as a master node and a slave node.

6. The network operating method of claim 1, further comprising:
detecting a failed link of the links in the spanning tree; and
automatically repairing the spanning tree by determining a new path between opposing nodes on the failed link without re-determining the entire spanning tree using the algorithm.

7. The network operating method of claim 5, further comprising:
detecting a failed link of the links in the spanning tree; and
at the master node, automatically repairing the spanning tree by determining a new path between opposing nodes on the failed link without re-determining the entire spanning tree using the algorithm.

8. The network operating method of claim 7, further comprising:
for each failed link on the master node, constructing an explicit route from the master node to a node at an opposing end of the failed link;
setting all links in the explicit route as links in the spanning tree if not already in the spanning tree; and
sending a repair flooding link message on the links in the explicit route.

9. The network operating method of claim 8, further comprising:
repeating the constructing step and the setting step for all additional working links at the master node.

10. The network operating method of claim 9, further comprising:
setting a timer for each working link at the master node;
upon expiration of the timer, checking if at least one acknowledgement message has been received by the master node;
if no acknowledgement messages are received, restarting the timer and resending the repair flooding link message; and
if at least one acknowledgement message is received, repeating the determining step, the checking step, the setting step, and the operating step.

11. The network operating method of claim 7, further comprising:
at each node receiving the repair flooding link message, if this is a terminating node in the explicit route, sending an acknowledgement message to a source of the repair flooding link message using a reverse path from the explicit route; and
else, enabling the link from which the repair flooding link message was received as a link in the spanning tree.

12. The network operating method of claim 11, further comprising:
if a next link in the explicit route is broken, sending a failed acknowledgement message to the source of the repair flooding link message;
else, forwarding the repair flooding link message to a next node in the explicit route.

13. The network operating method of claim 1, further comprising:
- at each node, constraining link state messages by sending the link state messages only on links in the spanning tree.

14. The network operating method of claim 1, further comprising:
- automatically implementing the network operating method without user input.

15. A link state routed network, comprising:
- a plurality of nodes;
- a plurality of links interconnecting the plurality of nodes and each exchanging data between the plurality of node; and
- an algorithm operating at each of the plurality of nodes and configured to automatically define and monitor a single spanning tree comprising some of the plurality of links, to repair the spanning tree responsive to a fault without re-defining the entire spanning tree, and to constrain link state message broadcast only to links in the spanning tree, wherein at least one of the plurality of links not part of the spanning tree does not have flooding of the link state message.

16. A network operating method with a spanning tree flooding topology, comprising:
- exchanging topology messages between a plurality of nodes in a network;
- upon achieving full adjacency of the plurality of nodes, executing Prim's algorithm at each of the plurality of nodes in the network thereby defining a single spanning tree in the network;
- checking between the plurality of nodes to ensure each of the plurality of nodes has the same topology of the spanning tree;
- operating the network comprising sending link state messages only on links in the spanning tree while using all links to exchange data thereon, wherein the network comprises at least one link not part of the spanning tree on which the link state messages are not flooded, and wherein the link state messages comprise topology information;
- detecting a failed link in the spanning tree; and
- automatically repairing the spanning tree by determining a new path between opposing nodes on the failed link without re-defining the entire spanning tree using Prim's algorithm.

* * * * *